US007015477B2

(12) United States Patent
Gunter

(10) Patent No.: US 7,015,477 B2
(45) Date of Patent: Mar. 21, 2006

(54) FILTERED BACKPROJECTION ALGORITHMS FOR COMPTON CAMERAS IN NUCLEAR MEDICINE

(76) Inventor: Donald Lee Gunter, 6221 Trinity Dr., Lisle, IL (US) 60532

(*) Notice: Subject to any disclaimer, the term of this patent is extended or adjusted under 35 U.S.C. 154(b) by 44 days.

(21) Appl. No.: 10/808,117

(22) Filed: Mar. 24, 2004

(65) Prior Publication Data
US 2004/0251418 A1 Dec. 16, 2004

Related U.S. Application Data

(60) Provisional application No. 60/458,131, filed on Mar. 27, 2003.

(51) Int. Cl.
*G01T 1/20* (2006.01)
(52) U.S. Cl. ................. 250/369; 250/366; 250/370.09; 250/370.1; 250/364.4
(58) Field of Classification Search ................ 250/366, 250/363.04, 367, 369, 370.09, 370.1
See application file for complete search history.

(56) References Cited

U.S. PATENT DOCUMENTS

| | | | | |
|---|---|---|---|---|
| 5,430,787 A | * | 7/1995 | Norton ......................... | 378/87 |
| 5,841,141 A | * | 11/1998 | Gullberg et al. ....... | 250/363.04 |
| 5,861,627 A | * | 1/1999 | Basko et al. ........... | 250/363.04 |
| 6,323,492 B1 | * | 11/2001 | Clinthorne .................. | 250/394 |
| 6,791,090 B1 | * | 9/2004 | Lin et al. .................... | 250/367 |

FOREIGN PATENT DOCUMENTS

JP 2002357661 A * 12/2002

OTHER PUBLICATIONS

A.C. Sauve, A.O. Hero, III, W.L. Rogers, S.J. Wilderman and N.H. Clinthorne, "*3D Image Reconstruction for a Compton SPECT Camera Model*," IEEE Transactions on Nuclear Science, vol. 46, No. 6, pp. 2075-2084, Dec. 1999.
C.E. Ordonez, W. Chang and Al. Bolozdynya, "*Angular Uncertainties Due to Geometry and Spatial Resolution in Compton Cameras*," IEEE Transactions on Nuclear Science, vol. 46, No. 4, pp. 1142-1147, Aug. 1999.
C.H. Hua, N.H. Clinthorne, S.J. Wilderman, J.W. LeBlanc and W.L. Rogers, "*Quantitative Evaluation of Information Loss for Compton Cameras*," IEEE Transactions on Nuclear Science, vol. 46, No. 3, pp. 587-593, Jun. 1999.
C.J. Solomon and R.J. Ott, "*Gamma Ray Imaging with Silicon Dectectors—A Compton Camera for Radionuclide Imaging in Medicine*," Nuclear Instruments and Methods in Physics Research, A273, pp. 787-792 (1988).

(Continued)

*Primary Examiner*—Albert Gagliardi
(74) *Attorney, Agent, or Firm*—Banner & Witcoff, Ltd.

(57) ABSTRACT

The present invention provides methods and apparatuses for constructing observed data from a Compton camera in order to provide a three-dimensional image of a radiopharmaceutical source distribution within a patient. No intermediate two-dimensional images are formed. Observed data may be analyzed by a processor in order to construct a three-dimensional image representing the source distribution. An idealized mathematical model may express the observed Compton camera data in terms of an integral over the source distribution. An exact analytic inversion is then found for this idealized model. The new analytic solutions arise from a generalization of the integral equation used to model the Compton camera. The kernel of the integral equation is modified by the introduction of an index p that describes the effect of source distance from the camera.

29 Claims, 17 Drawing Sheets

OTHER PUBLICATIONS

D. Doria and M. Singh, "*Comparison of Reconstruction Algorithms for an Electronically Collimated Gamma Camera,*" IEEE Transactions on Nuclear Science, vol. NS-29, No. 1, pp. 447-451, Feb. 1982.

F. Biggs, L.B. Mendelsohn, J.B. Mann, "*Hartfree-Fock Compton Profiles for the Elements,*" Atomic Data and Nuclear Data Tables, vol. 16, No. 3, pp. 201-206, Sep. 1975.

G. Matscheko, G.A. Carlsson and R. Ribberfors, "*Compton Spectroscopy in the Diagnostic X-Ray Energy Range. II Effects of Scattering Material and Energy Resolution,*" Phys. Med. Biol., vol. 34, No. 2, pp. 199-208, Sep. 1988.

J. Pauli, E.-M. Pauli, and G. Anton, "*ITEM—QM Solutions for EM Problems in Image Reconstruction Exemplary for the Compton Camera,*" Nuclear Instruments and Methods in Physics Research, A488, pp. 323-331 (2002).

J.B. Martin, G.F. Knoll, D.K. Wehe, N. Dogan, V. Jordanov, N. Petrick and M. Singh, "*A Ring Compton Scatter Camera for Imaging Medium Energy Gamma Rays,*" IEEE Transactions on Nuclear Science, vol. 40, No. 4, pp. 972-978, Aug. 1993.

J.B. Martin, N. Dogan, J.E. Gormley, G.F. Knoll, M. O'Donnell and D.K. Wehe, "*Imaging Multi-Energy Gamma-Ray Fields with a Compton Scatter Camera,*" IEEE Transactions on Nuclear Science, vol. 41, No. 4, pp. 1019-1025, Aug. 1994.

J.D. Kurfess, "*Compton Scatter Imaging in Astrophysics,*" IEEE Transactions on Nuclear Science, vol. 45, No. 3, pp. 936-942, Jun. 1988.

J.D. Valentine, C. Bonnerave and R.C. Rohe, "*Energy-Subtraction Compton Scatter Camera Design Considerations: A Monte Carlo Study of TIming and Energy Resolution Effects,*" IEEE Transactions on Nuclear Science, vol. 44, No. 3, pp. 1134-1139, Jun. 1997.

J.E. Gormely, W.L. Rogers, N.H. Clinthorne, D.K. Wehe and G.F. Knoll, "*Experimental Comparison of Mechanical and Electronic Gamma-Ray Collimation,* "Nuclear Instruments and Methods in Physics Research, A397, pp. 440-447 (1997).

J.W. LeBlanc, N.H. Clinthorne, C. Hua, W.L. Rogers, D.K. Wehe, S.J. Wilderman, "*A Compton Camera for Nuclear Medicine Applications Using $^{113m}IN$,*" Nuclear Instruments and Methods in Physics Research, A422, pp. 735-739 (1999).

J.W. LeBlanc, N.H. Clinthorne, C-H Hua, E. Nygard, W.L. Rogers, D.K. Weh, P. Weilhammer and S.J. WIlderman, "*C-Spring: A Prototype Compton Camera System for Low Energy Gamma Ray Imaging,*" IEEE Transactions on Nuclear Science, vol. 45, No. 3, pp. 943-949, Jun. 1998.

J.W. LeBlanc, N.H. Clinthorne, C-H Hua, E. Nygard, W.L. Rogers, D.K. Wehe, P. Weilhammer, S.J. Wilderman, "*Experimental Results from the C-SPRINT Prototype Compton Camera,*" IEEE Transactions on Nuclear Science, vol. 46, No. 3, pp. 201-204, Jun. 1999.

L.C. Parra, "*Reconstruction of Cone-Beam Projections from Compton Scattered Data,*" IEEE Transactions on Nuclear Science, vol. NS-47, pp. 1543-1550 (2000).

M. Hirasawa, T. Tomitani and S. Shibata, "*New Analytical Method for Three Dimensional Image Reconstruction in Multitracer Gamma-Ray Emission Imaging; Compton Camera for Multitracer,*" RIKEN Review No. 35, pp. 118-119, May 2001, Focused on New Trends in Bio-Trace Elements Research.

M. Singh and D. Doria "*An Electronically Collimated Gamma Camera for SIngle Photon Emission Computed Tomography, Part II: Image Reconstruction and Preliminary Experimental Measurements,*" Medical Physics, vol. 10, No. 4, pp. 428-435, Jul./Aug. 1983.

M. Singh and D. Doria "*Germanium-Scintillation Camera Coincidence Detection studies for Imaging Single Photon Emitters,*" IEEE Transactions on Nuclear Science, vol. NS-31, No. 1, pp. 594-598, Feb. 1984.

M. Singh and D. Doria "*Single Photon Imaging with Electronic Collimation,*" IEEE Transactions on Nuclear Science, vol. NS-32, No. 1, pp. 843-847, Feb. 1985.

M. Singh and R.R. Brechner, *Experimental Test-Object Study of Electronically Collimated SPECT*, The Journal of Nuclear Medicine, vol. 31, No. 2, pp. 178-186, Feb. 1990.

M. Singh, "*An Electronically Collimated Gamma Camera for Single Photon Emission Computed Tomography, Part I: Theoretical Considerations and Design Criteria,*" Medical Physics, vol. 10, No. 4, pp. 421-427, Jul./Aug. 1983.

M. Singh, R. Leahy, R. Brechner and T. Hebert, "*Noise Propagation in Electronically Collimated Single Photon Imaging,*" IEEE Transactions on Nuclear Science, vol. 35, No. 1, pp. 772-777, Feb. 1988.

M.G. Scannavini, R.D. Speller, G.J. Royle, I. Cullum, M. Raymond, G. Halland G. Iles, "*A Possible Role for Silicon Microstrip Detectors in Nuclear Medicine: Compton Imaging of Positron Emitters,*" Nuclear Instruments and Methods in Physics Research, A477, pp. 514-520 (2002).

M.J. Cree and P.J. Bones, "*Towards Direct Reconstruction from a Gamma Camera Based on Compton Scattering,*" IEEE Transactions on Medical Imaging, vol. 13, No. 2, pp. 398-407, Jun. 1994.

N. Dogan, K.D. Wehe and A.Z. Akcasu, "*A Source Reconstruction Method for Multiple Scatter Compton Cameras*", IEEE Transactions on Nuclear Science, vol. 39, No. 5, pp. 1427-1430, Oct. 1992.

N.H. Clinthorne, C. Ng, J. Strobel, C. Hua, J.W. LeBlanc, S.J. Wilderman and W.L. Rogers, "*Determining Detector Requirements for Medical Imaging Applications,*" Nuclear Instruments and Methods in Physics Research, A489, pp. 501-507 (1998).

N.H. Clinthorne, S.J. Wilderman, C. Hua, J.W. LeBlanc and W.L. Rogers, "*Choice of Scattering Detector for Compton-Scatter Cameras,*" Journal of Nuclear Medicine, vol. 39, No. 5, Proceedings of the 45th Annual Meeting, Scientific Papers, No. 193, May 1998 Supplement.

P. von Ballmoos, R. Diehl, and V. Schönfelder, "*Imaging the Gamma-Ray Sky with Compton Telescopes,*" Astronomy and Astrophysics, pp. 396-406, Feb. 1989.

R. Basko, G.L. Zeng, and G.T. Gullberg, "*Analytical Reconstruction Formula for One-Dimensional Compton Camera,*" IEEE Transactions on Nuclear Science, vol. 44, No. 3, pp. 1342-1346, Jun. 1977.

R. Basko, G.L. Zeng, and G.T. Gullberg, "*Application of Spherical Harmonics to Image Reconstruction for the Compton Camera,*" Phys. Med. Biol. 43, pp. 887-894 (1998).

R. Diehl, "*The Comptel Experiment on the NASA Gamma-Ray Observatory,*" Space Science Reviews 49, pp. 85-106, Jun. 1988.

R.A. Kroeger, W.N. Johnson, J.D. Kurfess and B.F. Phlips, "*Gamma Ray Polarimetry Using a Positon Sensitive Germanium Detector,*" Nuclear Instruments and Methods in Physics Research, A436, pp. 165-169 (1999).

R.C. Rohe and J.D. Valentine, "*An Energy-Substraction Compton Scatter camera Design for In Vivo Medical Imaging of Radiopharmaceuticals,*" IEEE Transactions on Nuclear Science, vol. 43, No. 6, pp. 3256-3263, Dec. 1996.

R.C. Rohe, M.M. Sharfi, K.A. Kecvar, J.D. Valentine and C. Bonnerave, "*The Spatially-Variant Backprojection Point Kernel Function of an Energy-Substraction Compton Scatter Camera for Medical Imaging,*" IEEE Transactions on Nuclear Science, vol. 44, No. 6, pp. 2477-2482, Dec. 1977.

R.R. Brechner and M. Singh, *Reconstruction of Electronically Collimated Images Obtained from Single Photon Emitters Using a Spherical System of Coordinates*, IEEE Transactions on Nuclear Science, vol. 33, No. 1, pp. 583-586, Feb. 1986.

R.R. Brechner and Manbir Singh, "*Iterative Reconstruction of Electronically Collimated Spect Images,*" IEEE Transactions on Nuclear Science, vol. 37, No. 3, pp. 1328-1332, Jun. 1990.

R.R. Brechner, M. Singh and R. Leahy, "*Computer Simulated Studies of Tomographic Reconstruction with an Electronically Collimated Camera for Spect,*" IEEE Transactions on Nuclear Science, vol. NS-34, No. 1, pp. 369-373, Feb. 1987.

R.W. Todd, J.M. Nightingale and D.B. Everett, "*A Proposed γ Camera,*" Nature, vol. 251, pp. 132-134, Sep. 1974.

S.J. Wilderman, W.L. Rogers, G.F. Knoll and J.C. Engdahl, "*Fast Algorithm for List Mode Back-Projection of Compton Scatter Camera Data,*" IEEE Transactions on Nuclear Science, vol. 45, No. 3, pp. 957-962, Jun. 1998.

T. Hebert, R. Leahy and M. Singh, "*Three-Dimensional Maximum-Likelihood Reconstruction for an Electronically Collimated Single-Photon-Emission Imaging System,*" Optical Society of America, vol. 7, No. 7, pp. 1305-1313, Jul. 1990.

T. Kamae, N. Hanada and R. Enomoto, "*Prototype Design of Multiple Compton Gamma-Ray Camera,*" IEEE Transactions on Nuclear Science, vol. 35, No. 1, pp. 352-355, Feb. 1988.

T. Kamae, R. Economoto and N. Hanada, "*A New Method to Measure Energy, Direction, and Polarization of Gamma Rays.*" Nuclear Instruments and Methods in Physics Research, A260, pp. 254-257 (1987).

T. Tomitani and M. Hirasawa, "*Image Reconstruction from Limited Angle Compton Camera Data*", Phys. Med. Biol. 47, pp. 2129-2145 (2002).

V. Schönfelder, R. Diehl, G.G. Lichti, H. Steinle, B.N. Swanenburg, A.J.M. Deerenberg, H. Aarts, J. Lockwood, W. Webber, J. Macri, J. Ryan, G. Simpson, B.G. Taylor, K. Bennett and M. Snelling, "*The Imaging Compton Telescope Comptel on the Gamma Ray Observatory,*" IEEE Transactions on Nuclear Science, vol. NS-31, No. 1, pp. 766-770, Feb. 1984.

V. Schönfelder, U. Graser and R. Diehl, "*Properties and Performance of the MPI Balloon Borne Compton Telescope,*" Astronomy and Astrophysics, pp. 138-151, Feb. 1982.

Y.F. Yang, Y. Gono, S. Motomura, S. Enomoto, and Y. Yano, "*Monte Carlo Simulations of the Performance of a Compton Camera Consisting of Position-Sensitive Germanium Detectors,*" Nuclear Instruments and Methods in Physics Research, A482, pp. 806-813 (2002).

\* cited by examiner

Front View — Side View

Hemispherical D2 Detector

Front View — Side View

Box-Shaped D2 Detector

Front View — Side View

Cylindrical D2 Detector

Front View — Stationary Detector — Side View

Equivalent Scanning Motion

FILTERED BACKPROJECTION ALGORITHMS FOR COMPTON CAMERAS IN NUCLEAR MEDICINE

This application claims priority to provisional U.S. Application. No. 60/458,131, filed Mar. 27, 2003.

FIELD OF THE INVENTION

The present invention relates to nuclear medicine for reconstructing a source distribution from Compton camera data in the application of nuclear medicine. In particular, the source distribution corresponds to a radiopharmaceutical distribution within a patient.

BACKGROUND OF THE INVENTION

In nuclear medicine, a radiopharmaceutical is injected into a patient and accumulates in tissues of physiological interest (e.g., cancer tumors or heart muscle). The gamma-ray emissions from this radiopharmaceutical are then observed and the local density of radiopharmaceutical within the patient reconstructed. Two clinical imaging techniques, single photon emission computed tomography (SPECT) and positron emission tomography (PET), are based on this simple idea and are currently available commercially. Both these imaging techniques use filtered backprojection (FBP) algorithms for the reconstruction of the three-dimensional (3D) distribution of radiopharmaceuticals within the patient. The advantages and limitations of SPECT and PET have been reviewed extensively in the literature and will not be further discussed here. It is generally acknowledged, however, that one of the major limitations of SPECT is the loss of counts due to the collimator in the gamma-ray camera. Typically only one gamma ray is observed for every ten thousand emissions, the vast majority of these gamma rays are absorbed in the collimator. In 1974 Todd, Nightingale, and Everett proposed a new type of gamma camera that would replace the collimator with a method of "electronic collimation" based on Compton scattering. Compton kinematics implies a relationship between the angle of scatter and the energy deposited in a detector. Knowledge of this energy and, therefore, the angle of scatter can be used to estimate the direction of an incident gamma-ray. The success of this strategy is notably demonstrated by the gamma-ray telescopes currently surveying the sky for sources of gamma emissions. In medical applications, however, the patient is located at a finite distance, so that the interpretation of the angular information provided by Compton events is complicated by huge parallax effects. In landmark research during the 1980s and 1990s, Manbir Singh and his group constructed and tested a prototype Compton camera. That research revealed both the promise and difficulties associated with Compton cameras. Many of the technical difficulties associated with Compton cameras (e.g., limited energy resolution, restrictive detector geometries, and events involving multiple scatters) are currently being remedied by advances in detector technology. Among the most significant of these problems is the 3D reconstruction of the radiopharmaceutical distribution from the data provided by a Compton camera.

The reconstruction of 3D images from Compton camera data poses a formidable mathematical problem. Unlike collimated cameras that reveal the direction of each gamma-ray, the incident direction of each event in a Compton camera is restricted to a cone. This geometric difference completely changes the nature of the reconstruction problem. In his original studies, Singh in collaboration with Hebert and Leahy implemented a maximum likelihood (ML) reconstruction (and tested other iterative methods). In recent years numerous alternative algorithms have been proposed and studied. Roughly speaking, these algorithms can be divided into iterative and analytic inversion methods. Both types of algorithm require the construction of a mathematical model that describes the Compton camera data in terms of the source distribution of radiopharmaceutical substance. Generally, the iterative methods can accommodate more intricate and accurate models, whereas, the analytic inversions require simpler models that are amenable to direct mathematical analysis. Most experimental groups working on Compton cameras have used iterative algorithms similar to the ML techniques of Singh et al. However, the reason for preferring iterative algorithms was not the accuracy of the mathematical model. After all, FBP algorithms (that are prototypes of analytic inversion) are generally used in clinical SPECT and PET despite the existence of ML algorithms for more accurate models. Basically, the iterative algorithms dominate Compton reconstruction because, until the late 1990s, no analytic algorithm existed for Compton cameras.

An algorithm for Compton cameras developed by Cree and Bones restricts the acceptable data as much as would a standard collimator—and is, therefore, unsuitable for practical applications. Shortly thereafter, Basko, Gullberg and Zeng produced and patented an algorithm (for the same mathematical model) that removed all restrictions on the Compton data. This algorithm explicitly rebins the Compton data into a form that leads to a 2D Radon transform (and, therefore, FBP). This rebinning procedure, which is the major drawback of the technique, overcomes the basic problem of Compton camera reconstruction; namely, the cone of incident gamma-ray directions. The rebinning implements a complex summation over spherical harmonics that arises from the cone of acceptance. Other researchers developed analytic-inversion algorithms that explicitly replace integrals over the acceptance cone with a summation over spherical harmonics. For example, Parra and Tomitani and Hirasawa retain the spherical harmonic expansions—truncating the series to a finite number of terms for numerical implementation. Although Parra and Tomitani and Hirasawa use a slightly different mathematical model than Basko et al, they face the same problem; namely, the additional degree of freedom introduced by the acceptance cone of the Compton camera. In reading the papers of Parra and Tomitani and Hirasawa, one is reminded of the initial papers of Cormack in which the Radon transform was rediscovered in terms of circular harmonics. One recalls that, when the problem was properly reformulated, the circular harmonics disappeared and the corresponding FBP algorithms emerged.

While these analytic algorithms were being developed, other groups examined alternative strategies. In the process of designing and building the C-SPRINT system, the group at the University of Michigan engaged in a broad-based campaign to establish Compton cameras as a viable imaging technology. Not only were simulations and sophisticated statistical analysis used for camera design, but the reconstruction problem was attacked using a variety of techniques. As a leading research institution in ML and statistical reconstruction, the University of Michigan implemented the most sophisticated iterative algorithms currently available. Furthermore, non-iterative reconstruction algorithms were also examined. Sauve et al studied matrix inversion techniques for a model of their system. The geometrical symmetries of the system were exploited in an attempt to handle the otherwise intractably large set of equations. In another approach, that is relevant to the research reported in this paper, Wilderman et al developed the software for list-mode back-projection of Compton scatter events into the appropriate cone geometries. In this research, they were joined by Rohe et al who also developed backprojection algorithms for the cone geometry of Compton cameras. Unfortunately, simple backprojection onto the appropriate cones (without filtering) does not produce accurate reconstruction of the source distribution.

With the current art, reconstruction of a radiopharmaceutical source distribution typically utilizes iterative algorithms. The current art also provides analytic-inversion techniques that may be inherently faster to execute but are typically deficient with respect to relative immunity to statistical noise and the desired accuracy of reconstructing the source distribution. Hence, there is a real need to develop methods and apparatus that utilize analytic-inversion techniques while providing accuracy in reconstructing a radiopharmaceutical source distribution within a patient in order to properly diagnose the patient.

BRIEF SUMMARY OF THE INVENTION

The present invention provides methods and apparatuses for acquisition and processing of the observed data from a Compton camera in order to construct a three-dimensional image of a radiopharmaceutical source distribution within a patient. No intermediate two-dimensional images are formed.

Another aspect of the invention provides apparatuses that include a Compton camera for obtaining observed data from a radiopharmaceutical source distribution. The observed data is analyzed by a processor in order to construct a three-dimensional image representing the source distribution. The three-dimensional image may be displayed for a clinician. Moreover, the clinician may provide input data for configuring the processor for processing the observed data.

With another aspect of the invention, an idealized mathematical model expresses the observed Compton camera data in terms of an integral over the source distribution. An exact analytic inversion is then found for this idealized model. The new analytic solutions arise from a generalization of the integral equation used to model the Compton camera. The kernel of the integral equation is modified by the introduction of an index p that describes the effect of source distance from the camera.

DETAILED DESCRIPTION OF THE INVENTION

The following terminology and notation is referenced in the following discussion.

BP backprojection operator

FBP filtered backprojection

FT Fourier transformation

LHS left hand side of an equation

RHS right hand side of an equation voxel The smallest distinguishable box-shaped part of a three-dimensional space. A particular voxel will be identified by the x, y and z coordinates of one of its eight corners, or perhaps its centre. The term is generally used in three dimensional modeling and sometimes generalized to higher dimensions.

$\delta(\ )$ Dirac delta function. The function is defined by the relation $f(0)=\int dx\, f(x)\delta(x)$ for all integrable functions $f(x)$. An alternative definition is $$\delta(x) = \lim_{\lambda \to 0} \frac{1}{\sqrt{2\pi}\,\lambda} \exp\left(-\frac{x^2}{\lambda^2}\right).$$

$\vec{e}_x, \vec{e}_y, \vec{e}_z$ unit vectors corresponding to the x, y, and z coordinates, respectively.

A mathematical model is proposed for Compton cameras. This model describes the expected data from a Compton camera in terms of the source distribution of radiopharmaceutical in the patient. In this model, a parameter p is introduced that describes the effect of the distance between the source and the primary (scatter) detector. A detailed justification of this model is given in Appendix A. The analysis in Appendix A indicates that the p=0 case corresponds most closely to actual Compton cameras. Backprojection operators (with a distance-dependent index q that is analogous to the index p of the model) are then introduced. The analysis of these backprojection operators requires the evaluation of an integral that is discussed in Appendix B. Appendix C demonstrates how one can select the index q to produce delta functions for p=½ and ¾, thereby simplifying the task of the inversion and eliminating the complicated summations over spherical harmonics. The backprojection operators are combined with filters (that are dependent on camera geometry) and analytic inversions of the Compton camera models are found. Because the case p=0 is not solved, one must consider these analytic inversions as approximations. The numerical implementation and noise immunity of the algorithms are discussed and exemplary results are presented. The implications of these algorithms for the design of Compton camera geometry are discussed.

Figure 1:
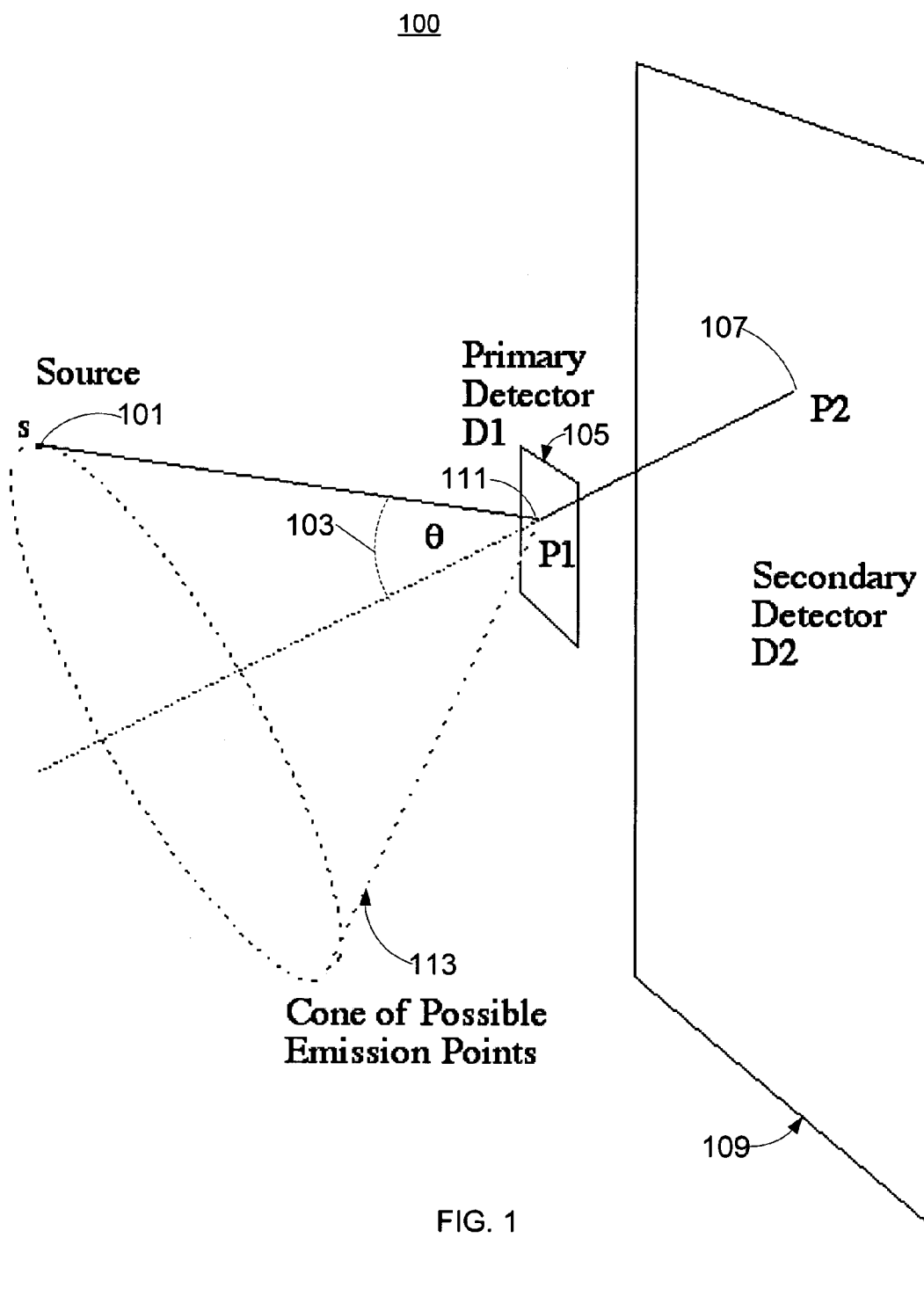
FIG. 1 shows a basic Compton cones geometry in accordance with an embodiment of the invention.

FIG. 1 shows a basic Compton cones geometry in accordance with an embodiment of the invention. The basic idea of electronic collimation is illustrated in FIG. 1. A gamma ray of energy E is emitted at source position (s) 101 (within the patient) and propagates to the primary detector (D1) 105 where it undergoes a Compton scattering that deposits energy $E_1$ at position (P1) 111. The scattered gamma-ray propagates to point (P2) 107 in the secondary detector (D2) 109 where it is absorbed by a photoelectric interaction and deposits the remaining energy $E_2$. (Generally, a detector with low atomic number Z is preferable for primary detector 105 so that Compton scatter is more likely; whereas, a detector with high Z is preferable for secondary detector 109 so that photoelectric absorption is more probable. In addition, primary detector 105 must be sufficiently thick for reasonable probability of Compton interaction, but not so thick that the scattered gamma ray is reabsorbed in primary detector 105.) In such a Compton camera 100, an event is registered whenever coincidence counts are observed in the primary and secondary detectors 105,109 that satisfy $$E = E_1 + E_2. \quad (1)$$

[In reality, the energies can be measured with only limited accuracy, so that events are accepted if the sum $(E_1+E_2)$ is within a window surrounding E.] Thus, for each event, Compton camera 100 provides four parameters: the positions of interaction (P1) 111 and (P2) 107, and the energies $E_1$ and $E_2$. Simple relativistic kinematics yields the Compton relation $$\frac{m_e E_1}{(E_1 + E_2)E_2} = (1 - \cos\theta) \quad (2)$$

where $m_e$ is the electron mass (511 keV) and $\theta$ is the angle of the Compton scattering. Two important conclusions can be drawn from equation (2). First, because $-1 \leq \cos\theta \leq 1$, one finds that $$E_1 \leq \frac{E^2}{(2E + m_e)} \quad \text{and} \quad \frac{m_e E}{(2E + m_e)} \leq E_2 \quad (3)$$

or, equivalently, $$\sqrt{E_1^2 + 2m_e E_1} - E_1 \leq 2E_2. \quad (4)$$

Inequality (4) provides an additional constraint on the acceptance of events, even in cases for which the incident energy E is unknown. Second, one observes that equation (2) provides an explicit relationship between the angle of scatter and the observed energies $$\sigma \equiv \cos\theta = \frac{(E_2^2 + E_1 E_2 - m_e E_1)}{(E_1 + E_2)E_2} \quad (5)$$

Compton camera 100 is based on this relationship; namely, the energies $E_1$ and $E_2$ determine the angle of scattering ($\theta$) 103. Thus, knowledge of the energies $E_1$ and $E_2$ implies that the incident gamma ray must have originated from one of the directions on the cone defined by $\sigma=\cos\theta$; so that, the source (s) 101 must lie on a cone 113 (as shown in FIG. 1). The basic mathematical problem posed by Compton camera 100 is that individual events are associated with cone 113 and not a unique direction (as in SPECT or PET). Reconstruction of the source distribution from such information has proven significantly more difficult than the standard FBP algorithms for SPECT and PET.

In addition to relativistic kinematics, further details of the Compton scattering are required for the reconstruction of the source distribution from the data of Compton camera 100. The probability of scattering at angle ($\theta$) 103 is proportional to the differential scattering cross section. For a free electron, the Compton scattering cross-section is given by the Klein-Nishina formula:

$$\frac{d\sigma_{KN}(\theta, E)}{d\Omega} = \frac{r_e^2}{2} \frac{\left\{(1 + \cos^2\theta)\left[1 + \frac{E}{m_e}(1 - \cos\theta)\right] + \frac{E^2}{m_e^2}(1 - \cos\theta)^2\right\}}{\left[1 + \frac{E}{m_e}(1 - \cos\theta)\right]^3} \quad (6)$$

where $r_e$ is the classical electron radius. In the following analysis, the weighting function W defined by $$W(\theta, E) = \frac{2}{r_e^2} \frac{d\sigma_{KN}(\theta, E)}{d\Omega} \quad (7)$$

$$= \frac{\left\{(1 + \cos^2\theta)\left[1 + \frac{E}{m_e}(1 - \cos\theta)\right] + \frac{E^2}{m_e^2}(1 - \cos\theta)^2\right\}}{\left[1 + \frac{E}{m_e}(1 - \cos\theta)\right]^3}$$

will be used. The function W gives the relative probability of a photon of energy E scattering at angle ($\theta$) 103 and has the units of steradian$^{-1}$. Unfortunately, the electrons in detector (D1) 105 (from which the gamma-ray scatters) are bound, not free. The bound state of the atomic electrons causes two effects that influence the performance of Compton camera 100. First, the electrons oscillate within the atoms of the detector leading to Doppler shifts that affect the relativistic kinematics of equation (5). This Doppler shift is characterized by momentum distributions [J($p_z$)] associated with the various atoms in the detector. This effect has been studied and the resultant errors in the scatter angle characterized. For low-energy gamma-rays, these errors can be significant. For this reason, materials that minimize the Doppler shift should be preferred for detector (D1) 105. Second, scattering at small angles (θ) 103 is suppressed if the energy transferred to the recoiling electron is insufficient for ejection from the atom. The scatter event is forbidden if the excited electron is driven into a previously occupied state, so that the cross section becomes dependent on the occupation of outer electron shells of the atom (or the Fermi surface of a metal). Extensive tables of the incoherent scattering function (which characterizes this suppression for the small angle scattering) are available and can be incorporated into the weighting function W. In general, both these effects are minor if the initial energy E is large (E>$m_e$). Despite potential problems for low energies (e.g., 140 keV emissions of Tc-99m), both effects are ignored in an embodiment of the invention.

The Compton camera geometry shown in FIG. 1 with a small primary detector (D1) 105 located in front of a large secondary detector (D2) 109 is a realistic model of the prototype geometry built by most researchers. The major limitation is the size of the D1 detector 105 which is generally a small, pixelated solid-state detector. A standard gamma-ray camera is often used for the D2 detector 109. Since the first development of Compton cameras, researchers have realized that this geometry is insufficient for 3D reconstruction. The problem can be solved by scanning the camera around the patient, thereby effectively increasing the area of the D1 detector 105. Experimentalists tend to rotate the camera around the patient in a circular orbit in emulation of SPECT. Some theoreticians extend the D1 and D2 detectors 105,109 to infinity and discuss planar detectors. Others surround the patient with spherical or cylindrical banks of detectors. Still others rotate infinite planar detectors around the patient. Because each geometry potentially requires a different reconstruction algorithm, one might expect a plethora of algorithms. However, the filtered backprojection algorithms, in an embodiment of the invention, display a significant invariance. The backprojection operation is unchanged by the detector geometry; whereas, the filter used on the backprojections depends on the geometry of primary detector (D1) 105 and its scanning trajectory. Consequently, one can make a list of relevant geometries (or scanning motions) for primary detector (D1) 105 and associate a filter with each geometry. This strategy provides a unified structure for development and evaluation of algorithms based on the geometry of primary detector (D1) 105. Five of these geometries are illustrated in FIGS. 2A–2E.

Figure 2A:
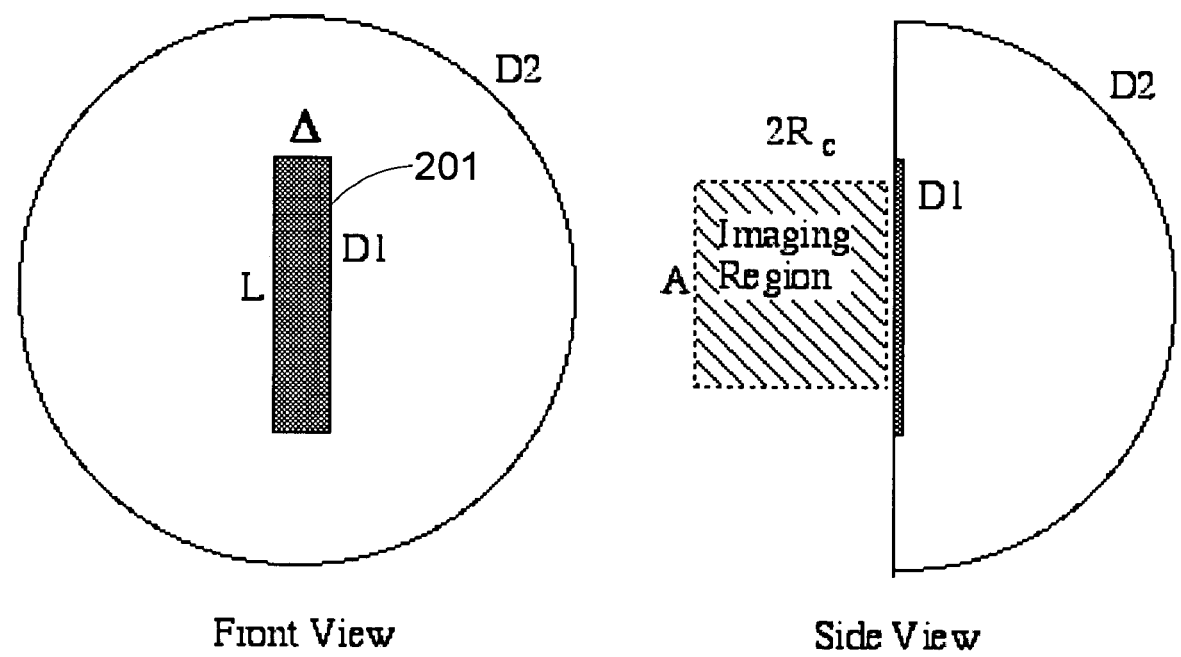
FIG. 2A shows a rectangular detector in accordance with an embodiment of the invention.
Figure 2B:
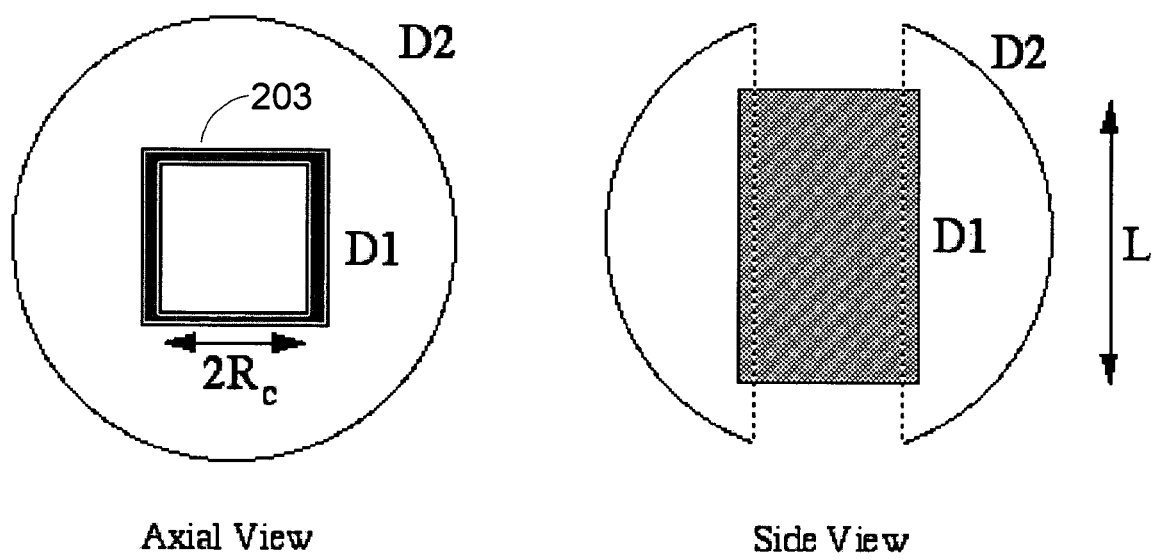
FIG. 2B shows a square prism detector in accordance with an embodiment of the invention.
Figure 2C:
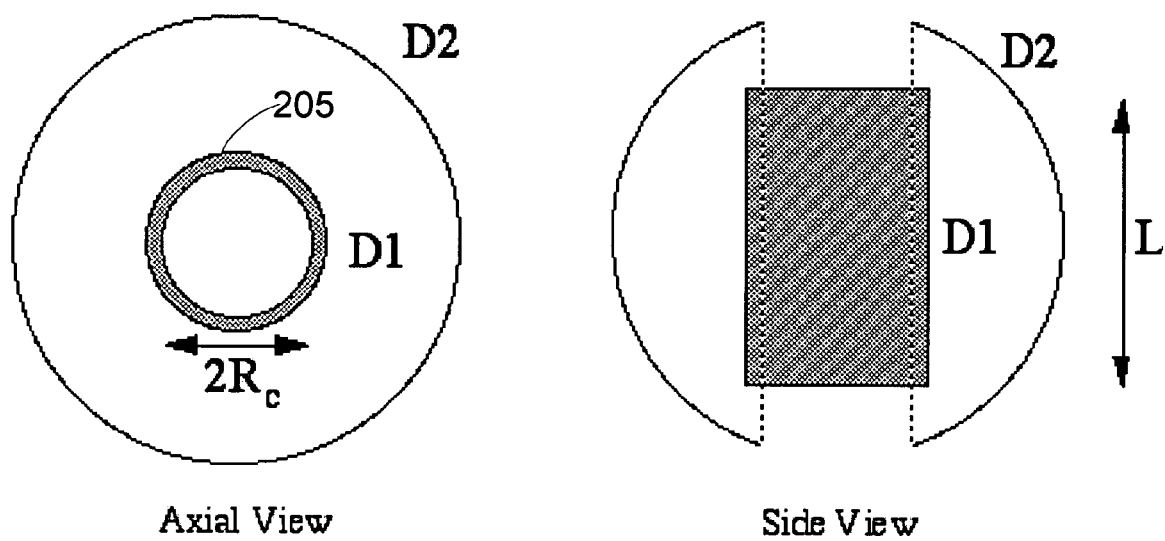
FIG. 2C shows a cylindrical geometry in accordance with an embodiment of the invention.
Figure 2D:
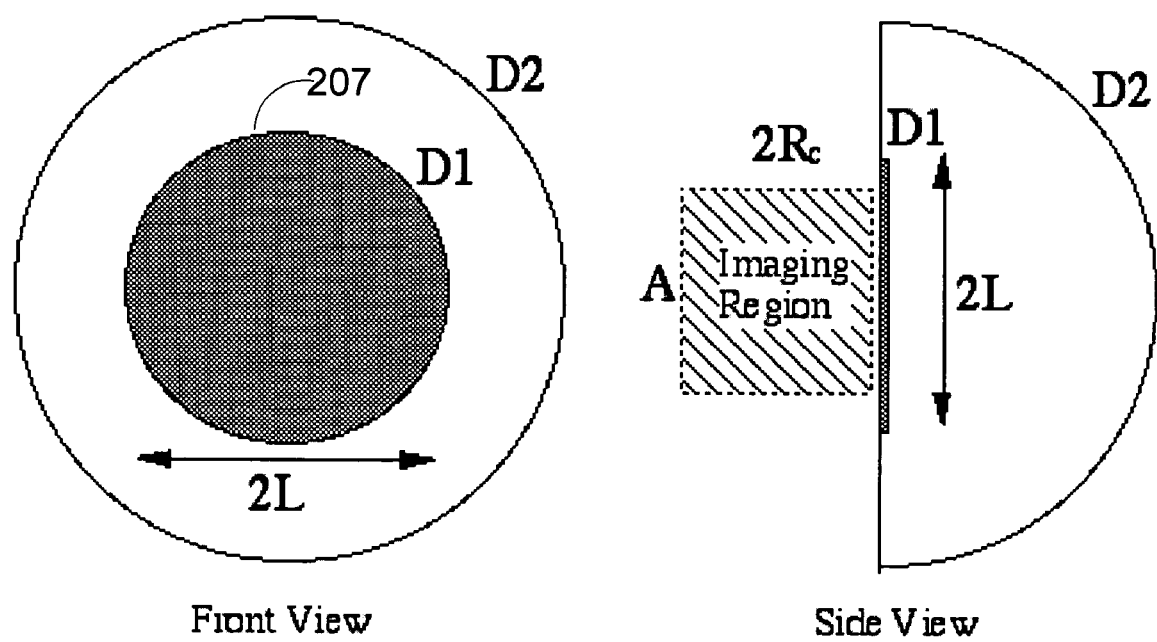
FIG. 2D shows a circular geometry in accordance with an embodiment of the invention.
Figure 2E:
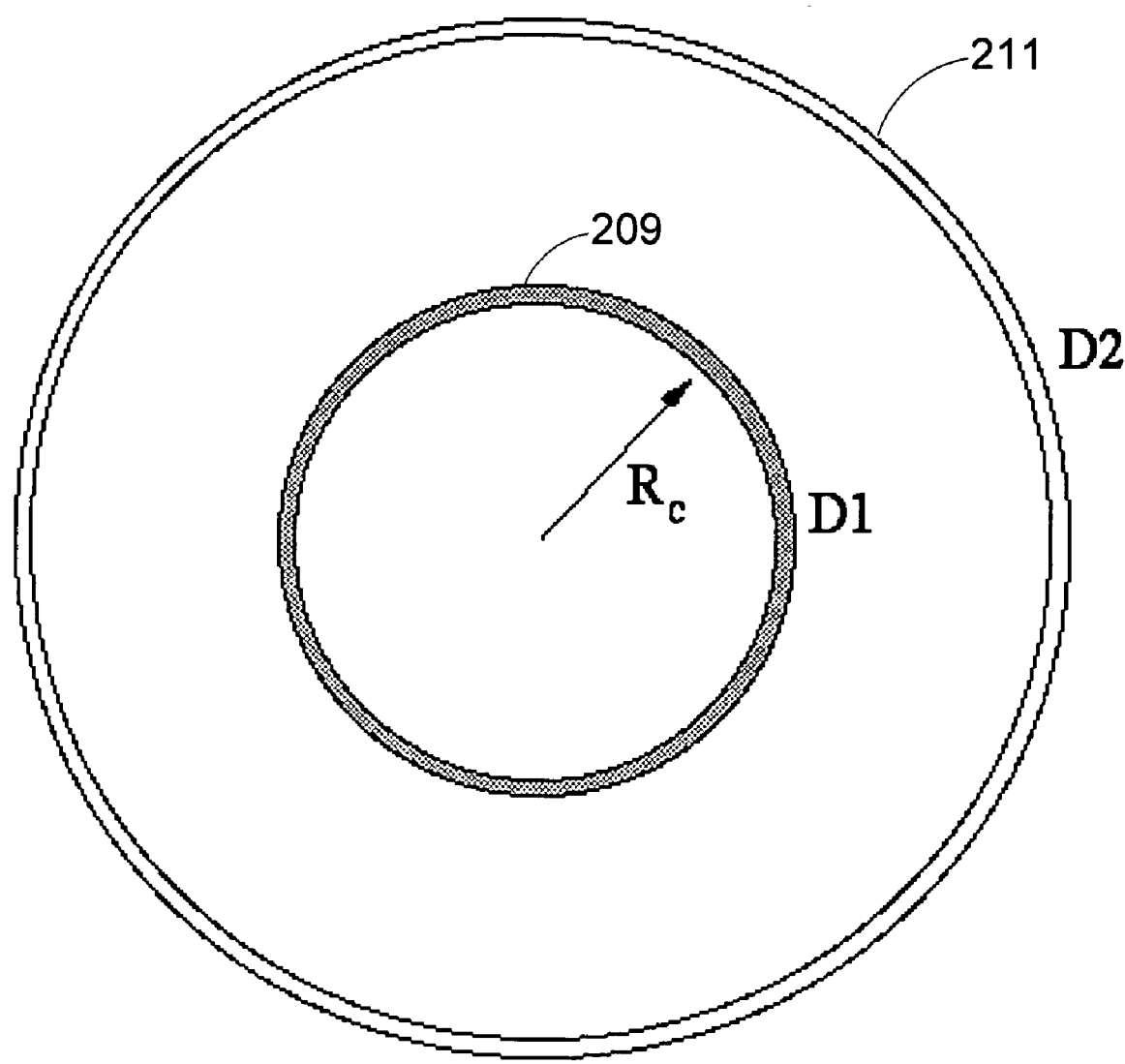
FIG. 2E shows a spherical detector in accordance with an embodiment of the invention.

FIG. 2A shows a rectangular detector in accordance with an embodiment of the invention. FIG. 2B shows a square prism detector in accordance with an embodiment of the invention. FIG. 2C shows a cylindrical geometry in accordance with an embodiment of the invention. FIG. 2D shows a circular geometry in accordance with an embodiment of the invention. FIG. 2E shows a spherical detector in accordance with an embodiment of the invention. Although all of the geometries in FIGS. 2A–2E have been discussed in the literature, few are currently considered practical. FIG. 2A shows one of the more practical designs, namely, a rectangular D1 detector 201 with dimensions L×Δ. FIG. 2B shows a (4-sided) rectilinear box detector 203 with two open ends and each side L×(2$R_c$). FIG. 2C is one of the favorites in the literature: D1 is a cylinder with radius $R_c$ and axial length L. FIG. 2D shows circular D1 detector 207 with radius L. The limit L→∞ of FIG. 2D corresponds to the infinite planar detector that is popular with theorists. Finally, FIG. 2E shows a spherical detector consisting of concentric spheres for detectors D1 and D2 209,211.

Possible D1 geometries are restricted by the size and shape of the patient. For this work, the patient (and, therefore, the source of radiation) will be restricted to a truncated cylinder of radius B and axial length A. One observes that B<A for human subjects. For some applications (i.e. cardiac or brain imaging), the axial length A may be truncated (to the chest or head region). The D1 detector is characterized by a radius $R_c$. The D1 detector is restricted to regions outside a cylinder of radius $R_c$>B for all geometries except spherical. For spherical detectors, the D1 radius, $R_c$, must be larger than $\sqrt{A^2+B^2}$ where A is the full height of the patient (so that the full patient can fit into the spherical detector).

The secondary D2 detectors are also subject to an important requirement. Not all scatter events in the D1 detector will enter the D2 detector. In particular, gamma-rays that are scattered back toward the source will miss the D2 detector. Obviously, one wants a large D2 detector (as shown in FIG. 1) so that as many events as possible will be observed. As will be discussed, the equations describing Compton camera performance imply an important relation between the D1 and D2 detectors. At each point $\vec{z} \in D1$, the D2 detector is visible (unobstructed by any intervening material) in a solid angle $\Omega(\vec{z}, D2)$. If this solid angle $\Omega(\vec{z}, D2)$ is a hemisphere for every point $\vec{z} \in D1$, then the information is sufficient for the filtered backprojection algorithms in an embodiment of the invention. The specific geometry of the D2 detector is not important. The only restriction on the D2 geometry is that, from every point in the D1 detector, the D2 detector must be capable of recording events from a complete hemisphere of scatter directions. In FIG. 1, this requirement is satisfied only if the planar D2 detector extends to infinity. The algorithms in an embodiment of the invention can still be implemented if this condition on D2 geometry is violated, but the resulting reconstructions may be suboptimal.

Figure 3:
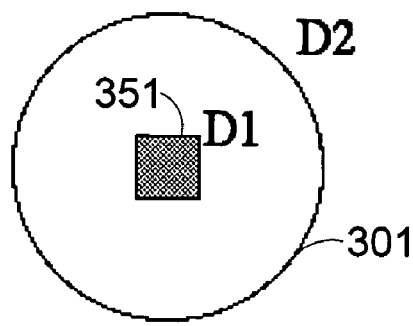
FIG. 3 shows alternative detector D2 geometries in accordance with an embodiment of the invention.
Figure 3:
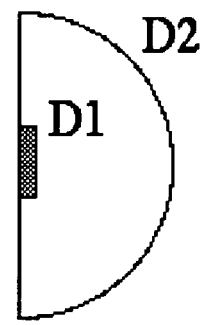
Figure 3:
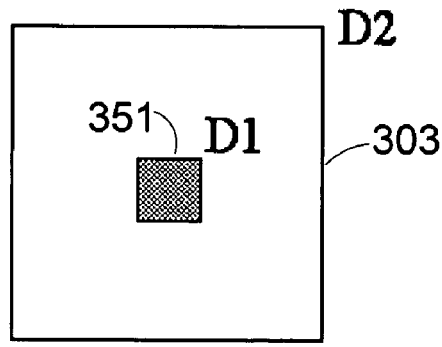
Figure 3:
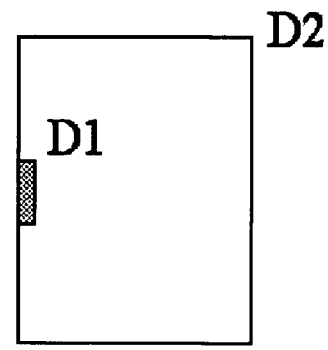
Figure 3:
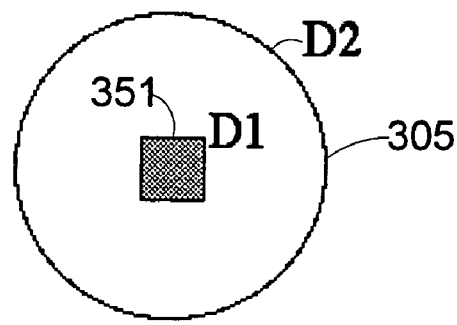
Figure 3:
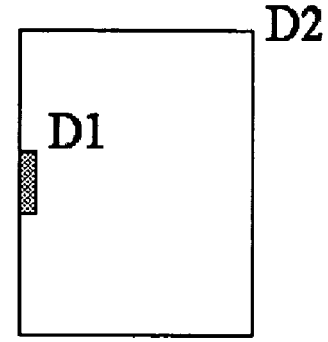

FIG. 3 illustrates three equivalent D2 geometries 301,303, 305 that satisfy the requirement for a small rectangular D1 detector 351. All the detector geometries in FIG. 2A–2E satisfy this requirement.

Figure 4A:
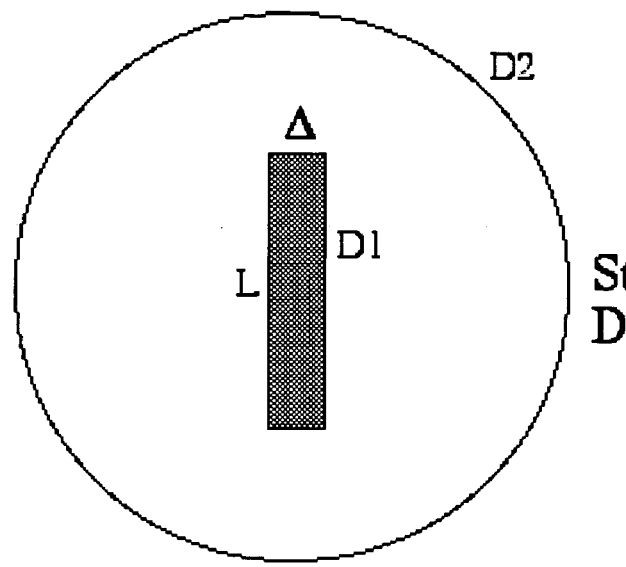
FIG. 4A shows alternative scanning geometries for a linear scan in accordance with an embodiment of the invention.
Figure 4A:
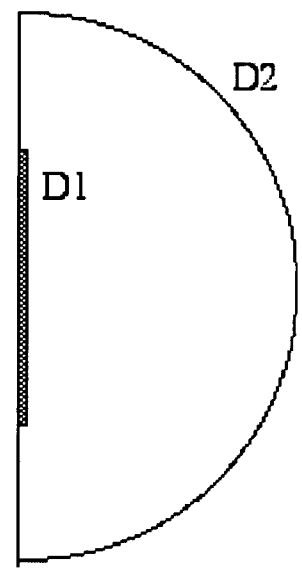
Figure 4A:
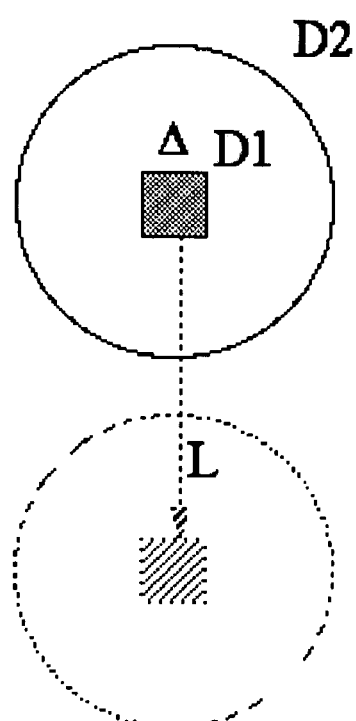
Figure 4A:
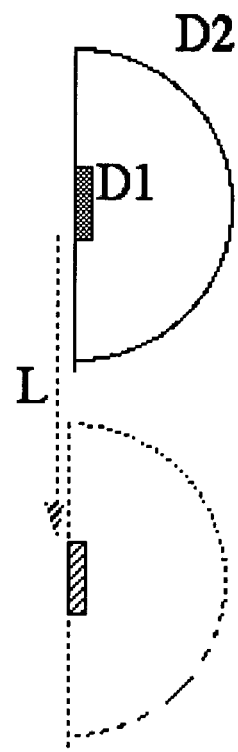
Figure 4B:
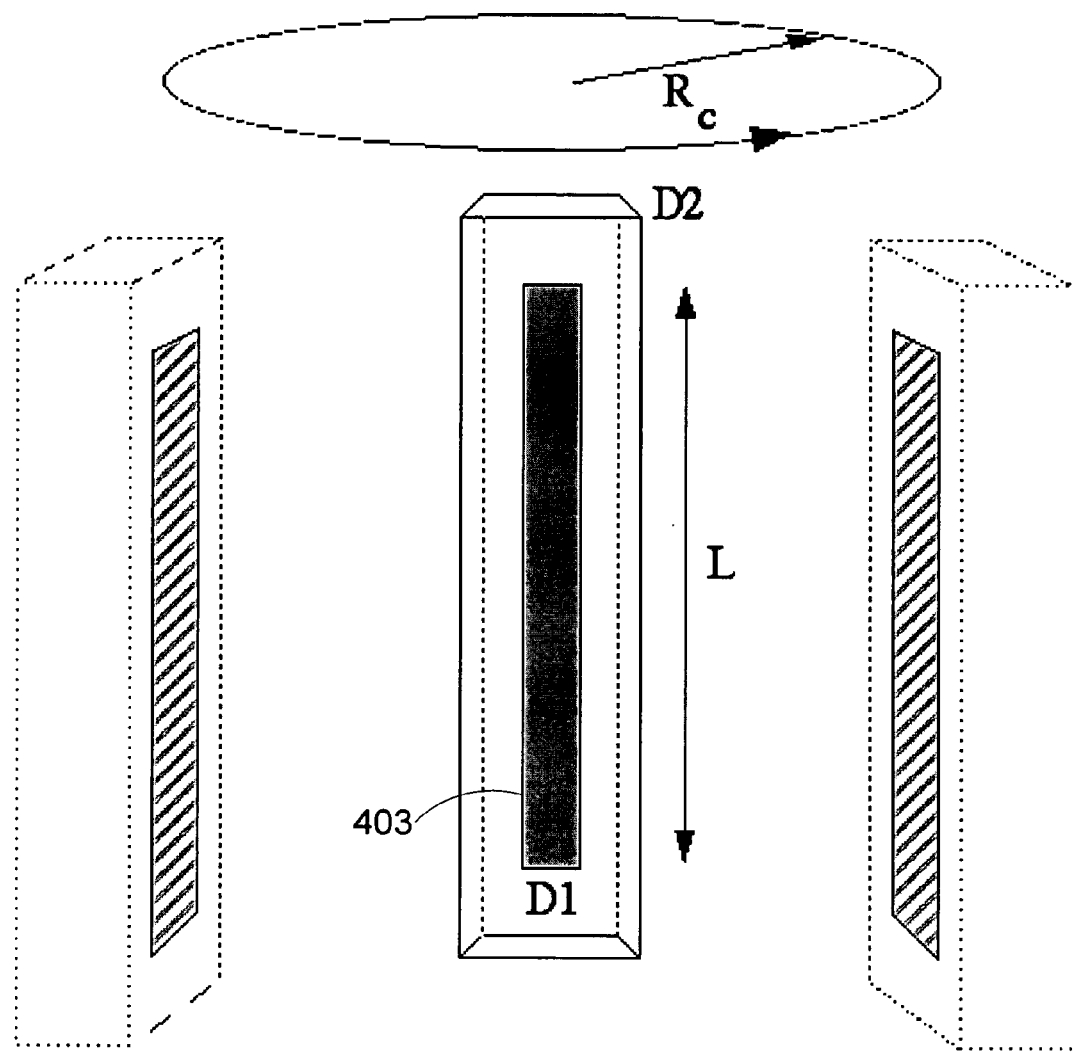
FIG. 4B shows alternative scanning geometries for an orbital scan in accordance with an embodiment of the invention.

FIGS. 4A and 4B illustrate that the D1 detector geometries in FIGS. 2A and 2C can be accomplished without the construction of special detector arrays. The same geometry can be achieved by scanning with a smaller detector. Furthermore, the geometry of rotating a small Δ×Δ detector around the patient is equivalent to the cylindrical geometry of FIG. 2C with L=Δ.

An embodiment of the invention provides a set of FBP algorithms that predict the distribution of radiopharmaceutical source distribution within a patient from the data acquired by Compton camera 100. For mathematical simplicity, the emissions of the radiopharmaceutical source distribution will be assumed monoenergetic with energy E. [This assumption can be dropped without affecting the final imaging equation (11). However, the notation becomes more complicated.] The distribution of radiopharmaceuticals is described by a function $f(\vec{x})$ that denotes the density of radiopharmaceuticals in the patient. The function f has dimensions cm$^{-3}$ (emissions/cm$^3$) and is a bounded, positive function with support within a cylinder of radius B and axial length A (i.e., the radiopharmaceuticals are contained within the body of the patient).

The data generated by Compton camera 100 are a collection of N coincidence events from the primary and secondary detectors 105,109. For SPECT studies, one typically collects $N \approx 10^7$ counts. Whereas, for Compton camera 100, one expects (at least) a one hundred-fold increase in sensitivity, so that $N \approx 10^9$. Each event provides four parameters that describe the coincident detection: the position z of the Compton scattering in primary (D1) detector 105, the position w of the photoelectric absorption in secondary (D2) detector 109, and the energies $E_1$ and $E_2$ deposited in these detectors. In summary, a coincident event provides two positions and energies: $(\vec{z}, E_1; \vec{w}, E_2)$ where $\vec{z} \in D1$ and $\vec{w} \in D2$. For purposes of data analysis, these data will be transformed into a new set of parameters:

$$(\vec{z}, E_1; \vec{w}, E_2) \Rightarrow (\vec{z}, \vec{n}, \sigma, E)$$

by the algebraic relations $$\vec{n} = \frac{(\vec{w} - \vec{z})}{|\vec{w} - \vec{z}|}, \quad E = E_1 + E_2, \text{ and } \sigma = \frac{(E_2^2 + E_1 E_2 - m_e E_1)}{(E_1 + E_2) E_2} \quad (8)$$

$\vec{z}$ represents the position of Compton scattering in the primary detector, $\vec{n}$ denotes the direction of the γ-ray after scattering, σ corresponds to the cosine of the angle between incident and scattered directions of the γ-ray, and E corresponds to the energy of the incident γ-ray. Each event is characterized by four parameters $(\vec{z}, \vec{n}, \sigma, E)$, such that $$\vec{z} \in D1, |\vec{n}|=1, \text{ and } -1 < \sigma < 1. \quad (9)$$

Thus, the two forms of the data have the same number of dimensions (6) and the parameters $E_1$ and $E_2$ are interchangeable with σ and E. However, the vectors $\vec{w}$ and $\vec{n}$ are subtly related by the geometry of the detector system; $\vec{w} \in D2$ whereas $|\vec{n}|=1$. The vector $\vec{n}$ denotes the direction of the γ-ray propagation after scatter. At each point $\vec{z} \in D1$ some directions $\vec{n}$ will not intersect the detector D2 109 and, therefore, are not sampled by the detector system. For this reason, Compton camera 100 is often called a "limited angle" imaging system and the data are called "incomplete." From this argument, many researchers have concluded that backprojection algorithms are not suitable for Compton cameras and that alternative (e.g., maximum likelihood) algorithms are the only appropriate method for reconstruction. One of the important ideas, in an embodiment of the invention, is that the data are complete if the vector $\vec{n}$ is sampled on a hemisphere at each point $\vec{z} \in D1$ [see the discussion following equation (12)]. Many current Compton camera designs meet this criterion.

[If the energy E of the incident γ-ray is known, the energy detected in secondary detector D2 109 becomes redundant. As a result, one could accept scatter events in detector D2 109, rather than requiring total absorption in a photoelectric interaction. This strategy is often proposed for high-energy radiation because the probability of photoelectric absorption in the secondary detector drops for higher energies. However, higher rates of accidental coincidence counts may result. In an embodiment of the invention, the reconstruction algorithms require the cosine of the scattering angle and the energy of the incident γ-ray E. The method by which these parameters are determined does not affect the algorithms.]

The list of events from the camera is next combined into a histogram of events $g(\vec{z}, \vec{n}, \sigma, E)$ that describes the imaging process. Because $\vec{n}$ and σ are expressed in dimensionless parameters (steradians and cosines, respectively), the resulting histogram ĝ function has dimensions $cm^{-2}$ corresponding to the density of observed events at the position $\vec{z}$ on the 2D surface D1. The observed function $g(\vec{z}, \vec{n}, \sigma, E)$ is related to the source distribution $f(\vec{x})$ by the integral equation:

$$g(\vec{z}, \vec{n}, \sigma, E) = W(\sigma, E) \int\int\int d^3\vec{x} f(\vec{x}) \frac{1}{2\pi R_c^p |\vec{z} - \vec{x}|^{2-p}} \quad (10)$$

$$\delta\left[\frac{\vec{n} \cdot (\vec{z} - \vec{x})}{|\vec{z} - \vec{x}|} - \sigma\right]$$

$$= W(\sigma, E) \int\int\int d^3\vec{x} f(\vec{x}) \frac{1}{2\pi R_c^p |\vec{z} - \vec{x}|^{1-p}}$$

$$\delta[\vec{n} \cdot (\vec{z} - \vec{x}) - \sigma|\vec{z} - \vec{x}|].$$

The physical justification and limitations of equation (10) are discussed in Appendix A. For all realistic imaging processes, the parameter p should vanish; the case p=0 implies that the radiation dies off as $r^{-2}$ as D1 detector 105 moves away from the source. For technical reasons, however, analytic inversion for the p=0 case (and more generally any integer value of p) is difficult. On the other hand, the p=±½ and 3⁄2 cases yield simple analytic solutions. The imaging equation (10) is a generalization that includes these analytic inversions. The function W is the dimensionless weighting function [defined in equation (7)] that accounts for the different count rates at various scattering angles. One can immediately absorb the function W into the LHS of equation (10) and write that $$\frac{g(\vec{z}, \vec{n}, \sigma, E)}{W(\sigma, E)} = \int\int\int d^3\vec{x} f(\vec{x}) \frac{1}{2\pi R_c^p |\vec{z} - \vec{x}|^{2-p}} \quad (11)$$

$$\delta\left[\frac{\vec{n} \cdot (\vec{z} - \vec{x})}{|\vec{z} - \vec{x}|} - \sigma\right]$$

$$= \int\int\int d^3\vec{x} f(\vec{x}) \frac{1}{2\pi R_c^p |\vec{z} - \vec{x}|^{1-p}}$$

$$\delta[\vec{n} \cdot (\vec{z} - \vec{x}) - \sigma|\vec{z} - \vec{x}|]$$

$$\equiv \hat{C}_p[f].$$

All energy dependence in equation (10) arises from the function W; so that, the resulting ratio g/W is independent of the total energy E. Equation (11) will be called the Compton imaging equation with index p and $\hat{C}_p$ is the Compton camera operator. This notation is slightly misleading because, once the function W is factored out, equation (11) actually describes an isotropic scattering process. However, the important idea, namely that the angle of scatter is determined by the energies, is retained. Straightforward dimensional analysis confirms that f has units of cm$^{-3}$ and g has units cm$^{-2}$. One should also note the symmetry $$\frac{g(\vec{z}, \vec{n}, \sigma, E)}{W(\sigma, E)} = \frac{g(\vec{z}, -\vec{n}, -\sigma, E)}{W(-\sigma, E)} \quad (12)$$

This symmetry is very important because, at any point $\vec{z}$, in the primary detector, half of the directions $\vec{n}$ are generally excluded from measurement. Equation (12) guarantees that the remaining directions $\vec{n}$ are sufficient for the determination of g over the full domain of $\vec{n}$. Thus, equation (12) is the basis of the geometric condition that detector (D2) 109 must cover a hemisphere of directions $\vec{n}$ for each point in detector (D1) 105. Another important property of equation (11) is that the integral on the RHS is a convolution integral in $(\vec{z} - \vec{x})$. Normally, convolution integrals are easily inverted with a Fourier transformation (FT). Unfortunately, the function g is known only on detector (D1) 105, not over the entire 3D range of $\vec{z}$ and, therefore, cannot be Fourier transformed. Thus, the most obvious inversion technique is not feasible.

Figure 5:
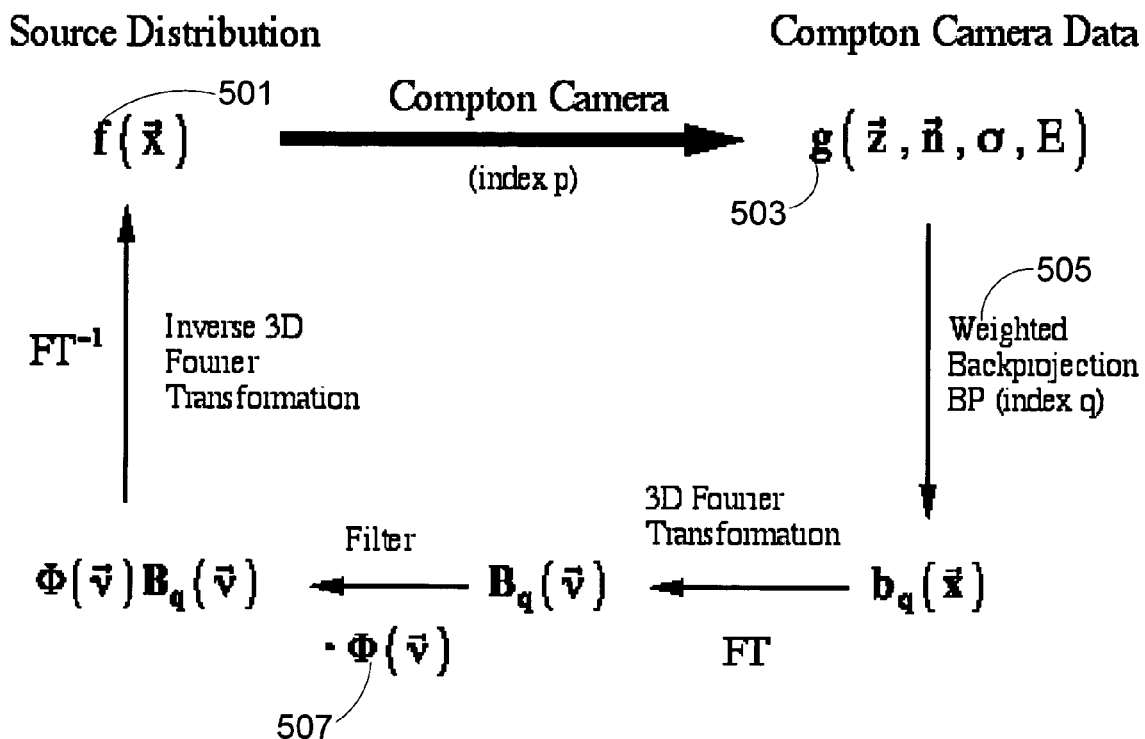
FIG. 5 shows a conceptual flowchart for filtered backprojection (FBP) algorithms in accordance with an embodiment of the invention.

FIG. 5 shows a conceptual flowchart for filtered backprojection (FBP) algorithms in accordance with an embodiment of the invention. The inverse problem for a Compton camera [of index p] can now be simply stated: one must find the function f in equation (11) that generates the observed function g. The inversion strategy employed, in an embodiment of the invention, is the standard backprojection strategy as illustrated in FIG. 5. The source distribution $f(\vec{x})$ 501 produces the Compton camera data $g(\vec{z}, \vec{n}, \sigma, E)$ 503 by experimental observation [as modeled by equation (10) with index p]. The inversion requires the selection of an appropriate combination of weighted backprojection operator (BP) 505 and filter function ($\Phi$) 507. An important step in this process is the selection of the correct backprojection operator. For the success of this inversion strategy, the FT of the backprojected data must be proportional to the FT of the original source distribution. The relation between these FTs is an integral equation [which is given in equation (24)] and the strategy can only succeed if the kernel in this integral equation is proportional to a delta function. The introduction of the apparently ad hoc weighting indices p [in equation (10)] and q [in equation (13) below] is required because the correct combination of p and q yields a delta function in equation (24) that renders filtered backprojection feasible.

In an embodiment of the invention, the backprojection operator (with index q) of g is defined by the equation:

$$\widehat{BP}_q \left[ \frac{g}{W} \right] = b_q(\vec{s}) \quad (13)$$

$$\equiv \int_{D1} d^2\vec{z} \int_{|\vec{n}|=1} d^2\vec{n} \int_{-1}^{1} d\sigma \frac{g(\vec{z}, \vec{n}, \sigma, E)}{W(\sigma, E)}$$

$$\frac{1}{2\pi R_c^{1+q} |\vec{z} - \vec{s}|^{2-q}} \delta\left[ \frac{\vec{n} \cdot (\vec{z} - \vec{s})}{|\vec{z} - \vec{s}|} - \sigma \right]$$

where D1 corresponds to the surface of primary detector 105. The integrals in equation (13) are analogous to the standard backprojection done in SPECT and PET; except that, rather than backprojecting the data onto a line, one backprojects onto a cone (described by the delta function). [Mathematically, the operator $\widehat{BP}_p$ is the adjoint of $\hat{C}_p$.] The index q is analogous to the index p in the imaging equation (11) and permits weighting of the backprojection with various powers of $|\vec{s} - \vec{z}|$ as one projects the data inward from the point of scattering $\vec{z}$ in detector D1 105. The motivation for the introduction of the index q will become apparent later in the calculation [see equations (29) and (30) and Appendix C]. The domain ($\vec{s}$) of the functions $b_q$ is the 3D region corresponding to the possible support of f and the functions $b_q$ have units of cm$^{-3}$ for all values of q. Thus, all the functions $b_q$ are candidates for the inversion of Compton camera imaging operator $\hat{C}_p$. The integral over $\vec{n}$ in equation (13) requires integration over the entire 2-sphere. As previously noted, the function g is seldom observed for $\vec{n}$ over the full 2-sphere. However, if the function g is observed over a hemisphere, one can use the symmetry of equation (12) for evaluation of g in the unobservable directions. In practical terms, this means that the integral over $\vec{n}$ in equation (13) can be evaluated using an integral over the "observed" directions $\vec{n}$ on a hemisphere; the contribution to equation (13) from the "unobserved" directions merely doubles the value of the resultant integral.

The backprojection operators will be examined using the functions $h_{q,p}$ defined by $$h_{q,p}(\vec{s}) \equiv \widehat{BP}_q \hat{C}_p[f] \quad (14)$$

$$= \int\int\int d^3\vec{x}\, f(\vec{x}) \int_{D1} d^2\vec{z}$$

$$\frac{1}{(2\pi)^2 R_c^{1+q+p} |\vec{z} - \vec{s}|^{2-q} |\vec{z} - \vec{x}|^{2-p}}$$

$$\int_{|\vec{n}|=1} d^2\vec{n} \int_{-1}^{1} d\sigma\, \delta\left[ \frac{\vec{n} \cdot (\vec{z} - \vec{s})}{|\vec{z} - \vec{s}|} - \sigma \right]$$

$$\delta\left[ \frac{\vec{n} \cdot (\vec{z} - \vec{x})}{|\vec{z} - \vec{x}|} - \sigma \right].$$

One might naively hope that $h_{q,p}=f$ for some p and q because, in that case, $\widehat{BP}_q$ would be the inverse operator for $\hat{C}_p$. Despite the fact that such hopes are not met, the evaluation of the functions $h_{q,p}$ will lead to useful FBP algorithms in the same manner that filtered backprojection arises in SPECT and PET. Performing the integral over $\sigma$ in equation (14), one finds $$h_{q,p}(\vec{s}) = \int\int\int d^3\vec{x}\, f(\vec{x}) \int_{D1} d^2\vec{z} \quad (15)$$

$$\frac{1}{(2\pi)^2 R_c^{1+q+p} |\vec{s} - \vec{z}|^{2-q} |\vec{x} - \vec{z}|^{2-p}}$$

-continued $$\int_{|\vec{n}|=1} d^2\vec{n}\ \delta\left[\frac{\vec{n}\cdot(\vec{z}-\vec{s})}{|\vec{s}-\vec{z}|} - \frac{\vec{n}\cdot(\vec{z}-\vec{x})}{|\vec{x}-\vec{z}|}\right].$$ (5)

Next, the integral over the 2-sphere $\vec{n}$ can be evaluated by a simple calculation $$\int_{|\vec{n}|=1} d^2\vec{n}\ \delta(\vec{n}\cdot\vec{v}) = \int_0^{2\pi} d\varphi \int_0^\pi d\theta \sin\theta\ \delta(|\vec{v}|\cos\theta) \qquad (16)$$

$$= \int_0^{2\pi} d\varphi \int_{-1}^1 d\mu\ \delta(|\vec{v}|\mu)$$

$$= 2\pi \int_{-1}^1 d\mu\ \delta(|\vec{v}|\mu)$$

$$= \frac{2\pi}{|\vec{v}|}\int_{-1}^1 d\mu\ \delta(\mu) = \frac{2\pi}{|\vec{v}|}$$

so that in equation (15) one finds $$h_{q,p}(\vec{s}) = \int\!\!\int\!\!\int d^3\vec{x}\ f(x) \int_{DI} d^2\vec{z}$$ (17)

$$\frac{1}{2\pi R_c^{1+q+p}|\vec{s}-\vec{z}|^{2-q}|\vec{x}-\vec{z}|^{2-p}\left|\frac{(\vec{x}-\vec{z})}{|\vec{x}-\vec{z}|} - \frac{(\vec{s}-\vec{z})}{|\vec{s}-\vec{z}|}\right|}.$$

Next, the 3D Fourier transformations (F and $H_{q,p}$) of the functions f and $h_{q,p}$ are defined by the equations $$F(\vec{v}) = \int\!\!\int\!\!\int d^3\vec{x}\ f(\vec{x})\exp[-2\pi i(\vec{v}\cdot\vec{x})]$$ (18)

$$\text{and } H_{q,p}(\vec{\omega}) = \int\!\!\int\!\!\int d^3\vec{s}\ h_{q,p}(\vec{s})\exp[-2\pi i(\vec{\omega}\cdot\vec{s})]$$ (19)

Thus, equation (17) can be written in the spatial-frequency domain as $$H_{q,p}(\vec{\omega}) = \int\!\!\int\!\!\int d^3\vec{v}\ F(\vec{v}) \int\!\!\int\!\!\int d^3\vec{x} \int\!\!\int\!\!\int d^3\vec{s}$$ (20)

$$\exp[2\pi i\vec{v}\cdot\vec{x} - 2\pi i\vec{\omega}\cdot\vec{s}] \int_{DI} d^2\vec{z}$$

$$\frac{1}{2\pi R_c^{1+q+p}|\vec{s}-\vec{z}|^{2-q}|\vec{x}-\vec{z}|^{2-p}\left|\frac{(\vec{x}-\vec{z})}{|\vec{x}-\vec{z}|} - \frac{(\vec{s}-\vec{z})}{|\vec{s}-\vec{z}|}\right|}.$$

One can translate the dummy variables of integration $\vec{s}$ and $\vec{x}$, $$\vec{x} \to \vec{x} + \vec{z}\ \text{ and } \vec{s} \to \vec{s} + \vec{z},$$

so that $$H_{q,p}(\vec{\omega}) = \int\!\!\int\!\!\int d^3\vec{v}\ F(\vec{v}) \int_{DI} d^2\vec{z}\exp[2\pi i(\vec{v}-\vec{\omega})\cdot\vec{z}]$$ (21)

$$\int\!\!\int\!\!\int d^3\vec{x} \int\!\!\int\!\!\int d^3\vec{s}$$

-continued $$\frac{\exp[2\pi i\vec{v}\cdot\vec{x} - 2\pi i\vec{\omega}\cdot\vec{s}]}{2\pi R_c^{1+q+p}|\vec{s}|^{2-q}|\vec{x}|^{2-p}\left|\frac{\vec{x}}{|\vec{x}|} - \frac{\vec{s}}{|\vec{s}|}\right|}.$$

Thus, one finds that the integrand on the RHS of equation (21) contains two independent terms:

$$M_{q,p}(\vec{v},\vec{\omega}) = \int\!\!\int\!\!\int d^3\vec{x} \int\!\!\int\!\!\int d^3\vec{s}$$ (22)

$$\frac{\exp[2\pi i\vec{v}\cdot\vec{x} - 2\pi i\vec{\omega}\cdot\vec{s}]}{2\pi R_c^{1+q+p}|\vec{s}|^{2-q}|\vec{x}|^{2-p}\left|\frac{\vec{x}}{|\vec{x}|} - \frac{\vec{s}}{|\vec{s}|}\right|}$$

and $$D(\vec{v}) = \int_{DI} d^2\vec{z}\ \exp(-2\pi i\vec{v}\cdot\vec{z}),$$ (23)

such that $$H_{q,p}(\vec{\omega}) = \int\!\!\int\!\!\int d^3\vec{v}\ F(\vec{v})\ M_{q,p}(\vec{v},\vec{\omega})\ D(\vec{\omega}-\vec{v})$$ (24)

The function $M_{q,p}$ contains all the important information about the backprojection operation, whereas the function D is a simple Fourier transform over the surface of primary detector D1 105. In the subsequent analysis, one finds that the properties of $M_{q,p}$ determine the weighting index q of the backprojection operator and the function D determines the appropriate filter function. The function $M_{q,p}$ will be examined first.

The function $M_{q,p}$ is evaluated by explicit integration in Appendix B. Unfortunately, the integral in equation (22) is only convergent if $-1<p<1$ and $-1<q<1$. The lower limits on convergence ($-1<p$ and $-1<q$) arise from the small distance behavior of the integrand ($|\vec{x}|\to 0$ and $|\vec{s}|\to 0$) and are intrinsic to the problem. However, the upper limits (p<1 and q<1) arise from the large distance behavior of the integrand ($|\vec{x}|\to\infty$ and $|\vec{s}|\to\infty$). For all practical applications, both the source distribution f and the backprojections $h_{q,p}$ have compact support, so that the behavior at extremely large distances should be unimportant. This suggests that the integral can be regularized and the divergences at large distances suppressed. In particular, one can choose $$M_{q,p}(\vec{v},\vec{\omega}) = \lim_{\varepsilon\to 0}\int\!\!\int\!\!\int d^3\vec{x}\int\!\!\int\!\!\int d^3\vec{s}$$ (25)

$$\frac{\exp\left[2\pi i\vec{v}\cdot\vec{x} - 2\pi i\vec{\omega}\cdot\vec{s} - \varepsilon\frac{(\sqrt{|\vec{x}|}+\sqrt{|\vec{s}|})}{\sqrt{R_c}}\right]}{2\pi R_c^{1+q+p}|\vec{s}|^{2-q}|\vec{x}|^{2-p}\left|\frac{\vec{x}}{|\vec{x}|} - \frac{\vec{s}}{|\vec{s}|}\right|}$$

which is convergent for $-1<p$ and $-1<q$. For all positive values of $\varepsilon$ the additional term in the exponential eliminates the divergences in the integral as $|\vec{x}|\to\infty$ and $|\vec{s}|\to\infty$. Furthermore, as shown in Appendix B, the limit as $\varepsilon\to 0$ is well-defined. The regularized integral in equation (25) will henceforth be used as the definition of $M_{q,p}$. This regularization is significant because the cases $q=3/2$ and $5/2$ will be important in the subsequent inversions as will be discussed.

For mathematical convenience, a unit vector on the 2-sphere will be denoted by $$\frac{\vec{k}}{|\vec{k}|} \equiv \vec{\Omega}_k \tag{26}$$

$$= \vec{\Omega}(\theta_k, \varphi_k)$$

$$= \cos\theta_k \; \vec{e}_3 + \sin\theta_k \sin\varphi_k \; \vec{e}_2 + \sin\theta_k \cos\varphi_k \; \vec{e}_1.$$

The evaluation of the function $M_{q,p}$ in Appendix B yields that $$M_{q,p}(\vec{v}, \vec{\omega}) = \frac{\pi^{1-p-q}}{R_c^{1+q+p}|\vec{\omega}|^{q+1}|\vec{v}|^{p+1}} \sum_{n=0}^{\infty} \frac{2}{(2n+1)} \frac{\Gamma\left(\frac{n}{2}+\frac{q}{2}+\frac{1}{2}\right)}{\Gamma\left(\frac{n}{2}-\frac{q}{2}+1\right)} \tag{27}$$

$$\frac{\Gamma\left(\frac{n}{2}+\frac{p}{2}+\frac{1}{2}\right)}{\Gamma\left(\frac{n}{2}-\frac{p}{2}+1\right)} \sum_{m=-n}^{n} Y_n^m(\vec{\Omega}_v)\left[Y_n^m(\vec{\Omega}_\omega)\right]^*$$

for $-1<p$ and $-1<q$, where the functions $Y_n^m(\vec{\Omega}_v)=Y_n^m(\theta_v, \phi_v)$ are the spherical harmonics. Recalling that $$\sum_{n=0}^{\infty}\sum_{m=-n}^{n} Y_n^m(\vec{\Omega}_v)\left[Y_n^m(\vec{\Omega}_\omega)\right]^* = \delta^2(\vec{\Omega}_v - \vec{\Omega}_\omega), \tag{28}$$

one observes (Appendix C) that $$M_{3/2,1/2}(\vec{v}, \vec{\omega}) = \frac{\delta^2(\vec{\Omega}_v - \vec{\Omega}_\omega)}{2\pi R_c^3 |\vec{\omega}|^{5/2} |\vec{v}|^{3/2}} \tag{29}$$

and $$M_{1/2,3/2}(\vec{v}, \vec{\omega}) = \frac{\delta^2(\vec{\Omega}_v - \vec{\Omega}_\omega)}{2\pi R_c^3 |\vec{\omega}|^{3/2} |\vec{v}|^{5/2}}. \tag{30}$$

The delta functions in equations (29) and (30) are extremely suggestive. The inversion algorithms for the Compton camera equation with $p=1/2$ and $3/2$ are a direct result of these equations. Indeed, the discovery of functions $M_{q,p}$ (or combinations of such functions) that produce delta functions of the form $\delta^2(\vec{\Omega}_v - \vec{\Omega}_\omega)$ is an important idea in an embodiment of the invention.

For the case $p=-1/2$, the functions $M_{5/2,-1/2}$ and $M_{1/2,-1/2}$ prove useful. In particular, one finds that $$M_{5/2,-1/2}(\vec{v}, \vec{\omega}) = \frac{1}{2\pi R_c^3|\vec{\omega}|^{7/2}|\vec{v}|^{1/2}} \sum_{n=0}^{\infty} \frac{\left(n^2+n-\frac{3}{4}\right)}{\left(n^2+n+\frac{1}{4}\right)} \tag{31}$$

$$\sum_{m=-n}^{n} Y_n^m(\vec{\Omega}_v)\left[Y_n^m(\vec{\Omega}_\omega)\right]^*$$

and $$M_{1/2,-1/2}(\vec{v}, \vec{\omega}) = \frac{4\pi^2 R_c^2}{2\pi R_c^3|\vec{\omega}|^{3/2}|\vec{v}|^{1/2}} \sum_{n=0}^{\infty} \frac{1}{\left(n^2+n+\frac{1}{4}\right)} \tag{32}$$

$$\sum_{m=-n}^{n} Y_n^m(\vec{\Omega}_v)\left[Y_n^m(\vec{\Omega}_\omega)\right]^*$$

so that $$M_{5/2,-1/2}(\vec{v}, \vec{\omega}) + \frac{1}{(2\pi R_c|\vec{\omega}|)^2} M_{1/2,-1/2}(\vec{v}, \vec{\omega}) = \tag{33}$$

$$\frac{\delta^2(\vec{\Omega}_v - \vec{\Omega}_\omega)}{2\pi R_c^3|\vec{\omega}|^{7/2}|\vec{v}|^{1/2}}.$$

This last identity provides the basis of inversion for the $p=-1/2$ case.

The three equations (29), (30) and (33) (with various parameters p and q) all yield the same basic expression that will be used in the subsequent inversions. For convenience, that mathematical expression will be defined as $$\hat{M}_k(\vec{v}, \vec{\omega}) \equiv \frac{\delta^2(\vec{\Omega}_v - \vec{\Omega}_\omega)}{2\pi R_c^3|\vec{\omega}|^{2+k}|\vec{v}|^{2-k}} \tag{34}$$

For those combinations of p and q that produce $\hat{M}_k$, one can rewrite equation (24) as $$\hat{H}_k(\vec{\omega}) = \int\int\int d^3\vec{v}\, F(\vec{v})\, \hat{M}_k(\vec{v}, \vec{\omega})\, D(\vec{\omega} - \vec{v}) \tag{35}$$

so that $$4\pi R_c^3|\omega|^{2+k} \hat{H}_k(\omega\vec{\Omega}_\omega) = \int_{-\infty}^{\infty} dv|v|^k F(v\vec{\Omega}_\omega) D[(\omega-v)\vec{\Omega}_\omega] \tag{36}$$

[In equation (36) the identity $$\int\int\int d^3\vec{v} = \int_0^{\infty} dv|v|^2 \int\int d^2\vec{\Omega}_v \tag{37}$$

$$= \frac{1}{2}\int_{-\infty}^{\infty} dv|v|^2 \int\int d^2\vec{\Omega}_v$$

is used so that the range of the integral is $(-\infty, \infty)$ rather than $[0, \infty)$.] An important observation is that the RHS of equation (36) is a 1D convolution integral. Thus, standard Fourier techniques permit the analytic inversion of equation (36) and the recovery of the function F from the backprojected data, $\hat{H}_k$. The function D is obviously important in such an inversion.

The function D is determined by the geometry of the primary detector D1 105. The definition of D [equation (25)] suggests that, for many geometries, D will contain delta functions. Such delta functions may simplify the integral in equation (36). However, not all geometries will produce delta functions and care is required in many geometries that do produce delta functions.

In an embodiment of the invention, five basic detector geometries are examined (FIGS. 2A–2E). In Table 1, each of these detector geometries is described and the function D displayed.

detector geometry 5 (bottom row of Table 1) is a spherical detector with radius $R_c$ surrounding the imaging region.

Detector geometries 1 through 4 will be examined in the limit as $L \to \infty$. Recalling that $$\lim_{L \to \infty} [L \operatorname{sinc}(\pi L v)] = \delta(v) \tag{38}$$

and $$\lim_{L \to \infty} \left[ \pi L \frac{J_1(2\pi L v)}{2\pi L v} \right] = \delta(v) \tag{39}$$

TABLE 1

The function D(v) for different camera geometries

| Geometry | D1 Surface | $D(\vec{v})$ | $\lim_{L \to \infty} D(\vec{v})$ $(L \gg 4 \max(A, R_c))$ |
|---|---|---|---|
| 1. Rectangular Detector | $-L/2 < z < L/2, -\Delta/2 \le y \le \Delta/2,$ $x = R_c$ | $D_1(\vec{v}) = \Delta L \operatorname{sinc}(\pi \Delta \vec{v} \cdot \hat{e}_y) \operatorname{sinc}(\pi L \vec{v} \cdot \hat{e}_z) \times \exp(2\pi i R_c \vec{v} \cdot \hat{e}_x)$ | $D_1(\vec{v}) = \Delta \delta(\vec{v} \cdot \hat{e}_y) \operatorname{sinc}(\pi L \vec{v} \cdot \hat{e}_z) \times \exp(2\pi i R_c \vec{v} \cdot \hat{e}_x)$ |
| 2. Square Prism Detector | $-L/2 < z < L/2, -R_c \le y \le R_c,$ $x = \pm R_c$ $-L/2 < z < L/2, -R_c \le x \le R_c,$ $y = \pm R_c$ | $D_2(\vec{v}) = 4 R_c L \operatorname{sinc}(\pi L \vec{v} \cdot \vec{e}_z) \times$ $\begin{bmatrix} \operatorname{sinc}(2\pi R_c \vec{v} \cdot \vec{e}_y) \cos(2\pi R_c \vec{v} \cdot \vec{e}_x) + \\ \operatorname{sinc}(2\pi R_c \vec{v} \cdot \vec{e}_x) \cos(2\pi R_c \vec{v} \cdot \vec{e}_y) \end{bmatrix}$ | $D_2(\vec{v}) = 4 R_c \delta(\vec{v} \cdot \vec{e}_z) \times$ $\begin{bmatrix} \operatorname{sinc}(2\pi R_c \vec{v} \cdot \vec{e}_y) \cos(2\pi R_c \vec{v} \cdot \vec{e}_x) + \\ \operatorname{sinc}(2\pi R_c \vec{v} \cdot \vec{e}_x) \cos(2\pi R_c \vec{v} \cdot \vec{e}_y) \end{bmatrix}$ |
| 3. Cylindrical Detector | $-L/2 < z < L/2, x^2 + y^2 = R_c^2$ | $D_3(\vec{v}) = 2\pi R_c L \operatorname{sinc}(\pi L \vec{v} \cdot \vec{e}_z) \times$ $J_0 \left( 2\pi R_c \sqrt{(\vec{v} \cdot \vec{e}_x)^2 + (\vec{v} \cdot \vec{e}_y)^2} \right)$ | $D_3(\vec{v}) = 2\pi R_c \delta(\vec{v} \cdot \vec{e}_z) \times$ $J_0 \left( 2\pi R_c \sqrt{(\vec{v} \cdot \vec{e}_x)^2 + (\vec{v} \cdot \vec{e}_y)^2} \right)$ |
| 4. Circular Detectors | $0 \le (y^2 + z^2) \le L^2, x = R_c$ | $D_4(\vec{v}) = 4\pi L^2 \frac{J_1 \left( 2\pi L \sqrt{(\vec{v} \cdot \vec{e}_y)^2 + (\vec{v} \cdot \vec{e}_z)^2} \right)}{2\pi L \sqrt{(\vec{v} \cdot \vec{e}_y)^2 + (\vec{v} \cdot \vec{e}_z)^2}} \times \exp(2\pi i R_c \vec{v} \cdot \vec{e}_x)$ | $D_4(\vec{v}) = 4L \delta \left( \sqrt{(\vec{v} \cdot \vec{e}_y)^2 + (\vec{v} \cdot \vec{e}_z)^2} \right) \times \exp(2\pi i R_c \vec{v} \cdot \vec{e}_x)$ |
| 5. Spherical Detector | $x^2 + y^2 + z^2 = R_c^2$ | $D_5(\vec{v}) = 4\pi R_c^2 \operatorname{sinc}(2\pi R_c |\vec{v}|)$ | $D_5(\vec{v}) = 4\pi R_c^2 \operatorname{sinc}(2\pi R_c |\vec{v}|)$ |

Detector geometry 1 (first row of Table 1) is a rectangular area with dimensions L×☐. The actual detector need not have physical dimensions L×Δ, one could scan a much smaller detector over the region (FIG. 4A) and the resulting function D would be the same. Detector geometry 2 (second row of Table 1) is a square prism (an elongated box without top or bottom). This geometry is a simple application of the first geometry; the function D can be evaluated by a summation of the terms for the four sides. Detector geometry 3 (third row of Table 1) is a cylinder of radius $R_c$ and length L. Once again, the primary detector D1 105 need not be a cylinder if the surface D1 is sampled by scanning. One might build a ring detector and scan it along the axis or one might build a narrow strip detector 403 and rotate it around the axis (as shown in FIG. 4B). Either configuration would yield the same function D. Detector geometry 4 (fourth row of Table 1) is a large circular detector of radius L. Finally, one observes that these limits yield the delta functions needed for the simple inversion of equation (36). In reality, of course, no detector can be extended to infinity. However, because the region of source reconstruction has finite dimensions (cylindrical radius $R_c$ and axial length A where generally $R_c < A$), one need not sample the spatial frequency in steps smaller than $(\Delta v) \approx 1/(2A)$. The width of the sinc function in equation (38) is approximately $(\Delta v) \, 2/L$. Thus, if $L > 4A$, then L should be sufficiently large that the function D can be approximated as a delta function. [A similar argument applies for the Bessel function in equation (39).] In particular, the last column of Table 1 displays the $L \to \infty$ limit of the function D for detector geometries 1–4. For the spherical detector geometry (5), no limit yields a delta function.

Equation (36) provides the prototypical equation for all the inversion algorithms in an embodiment of the invention.

Using the delta function approximations for $D_i$ of detector geometries 1 through 3, one finds that $$D_i\left[(\omega - \nu)\vec{\Omega}_\omega\right] = K_i \delta\left[(\omega - \nu)(\vec{\Omega}_\omega \cdot \vec{e}_z)\right] \qquad (40)$$

$$= \frac{K_i \delta(\omega - \nu)}{|\vec{\Omega}_\omega \cdot \vec{e}_z|}$$

where the constants $K_i$ are given by $$K_1 = A, \ K_2 = 8R_c, \text{ and } K_3 = 2\pi R_c. \qquad (41)$$

Substitution of equation (40) into equation (36) yields $$4\pi R_c^3 |\omega|^{2+k} \hat{H}_k(\omega \vec{\Omega}_\omega) = \frac{K_i |\omega|^k}{|\vec{\Omega}_\omega \cdot \vec{e}_z|} F(\omega \vec{\Omega}_\omega) \qquad (42)$$

or $$F(\vec{v}) = \frac{4\pi R_c^3}{K_i} |\vec{v}| |\vec{v} \cdot \vec{e}_z| \hat{H}_k(\vec{v}) \qquad (43)$$

Equation (43) provides a filtered backprojection algorithm for the source distribution F in detector geometries 1, 2, and 3. [The second equality in equation (40) presumes that $|\vec{\omega}_\omega \cdot \vec{e}_z| \neq 0$. Consequently, the results in equation (43) are not rigorous on the $|\vec{v} \cdot \vec{e}_z| = 0$ plane. Nonetheless, equation (43) is satisfied for $\vec{v}$ arbitrarily close to the $|\vec{v} \cdot \vec{e}_z| = 0$ plane. Thus, the continuity of the function F suggests that equation (43) will also be valid on the $|\vec{v} \cdot \vec{e}_z| = 0$ plane.] Surprisingly, the algorithm does not depend on the index k because the same power appears on both sides of equation (42) and is canceled. For circular detector geometry 4, the delta function approximation yields a similar result, namely, $$F(\vec{v}) = \frac{\pi R_c^3}{L} |\vec{v}| \sqrt{(\vec{v} \cdot \vec{e}_y)^2 + (\vec{v} \cdot \vec{e}_z)^2} \ \hat{H}_k(\vec{v}) \qquad (44)$$

Equations (43) and (44) demonstrate that, if the detector geometry produces a function D containing a delta function, a simple filtered backprojection algorithm follows immediately.

Unfortunately, the spherical detector geometry (5) does not produce a function $D_5$ containing a delta function. The substitution of $D_5$ (from Table 1) in equation (36) gives the 1D convolution equation $$2R_c^2|\omega|^{2+k} \hat{H}_k(\omega \vec{\Omega}_\omega) = \int_{-\infty}^{\infty} d\nu |\nu|^k F(\nu \vec{\Omega}_\omega) \qquad (45)$$

$$2R_c \, \text{sinc}[2\pi R_c(\omega - \nu)]$$

Fourier analysis provides a straightforward method for inversion of such a convolution equation. However, a property of the sinc function provides an even more powerful method. If one defines $$s(\omega) \equiv 2R_c \, \text{sinc}(2\pi R_c \omega) \qquad (46)$$

then $$s(\nu) = \int_{-\infty}^{\infty} d\omega \, s(\nu - \omega) s(\omega) \qquad (47)$$

[Equation (47) follows immediately from the fact the Fourier transform of s is equal to unity on the interval $(-R_c, R_c)$ and vanishes elsewhere. As a result, the square of the Fourier transform of s is equal to itself. By the convolution theorem, therefore, s must satisfy equation (47).] Thus, by taking a convolution integral with s on both sides of equation (45), one finds that $$\int_{-\infty}^{\infty} d\omega \, 2R_c^2 |\omega|^{2+k} \hat{H}_k(\omega \vec{\Omega}_\omega) s(\nu - \omega) = \qquad (48)$$

$$\int_{-\infty}^{\infty} d\omega |\omega|^k F(\omega \vec{\Omega}_\omega) s(\nu - \omega)$$

The obvious solution of equation (48) is $$F(\vec{\omega}) = 2R_c^2 |\vec{\omega}|^2 \hat{H}_k(\vec{\omega}) \qquad (49)$$

Of course, solutions of the homogeneous integral equation $$\int_{-\infty}^{\infty} d\omega |\omega|^k F_{homo}(\omega \vec{\Omega}_\omega) s(\nu - \omega) = 0 \qquad (50)$$

can be added to equation (49). The selection of a particular homogeneous solution requires an additional criterion. For all practical purposes, the homogeneous term can be assumed to vanish and equation (49) gives the resulting solution. Equation (48) implies a consistency condition on the function $\hat{H}_k$; namely, $$|\nu|^{2+k} \hat{H}_k(\nu \vec{\Omega}_\omega) = \int_{-\infty}^{\infty} d\omega |\omega|^{2+k} \hat{H}_k(\omega \vec{\Omega}_\omega) \qquad (51)$$

$$2R_c \, \text{sinc}[2\pi R_c(\nu - \omega)].$$

Filtered backprojection algorithms can now be stated for the Compton imaging equation of indices $p = \pm\frac{1}{2}$ and $\frac{3}{2}$. These FBP algorithms are based on five assumptions that have been stated earlier, are implicit in the previous analysis, and are repeated here for completeness. First, the data from the Compton camera take the form of a function $g(\vec{z}, \vec{n}, \sigma, E)$ that is known on the domain defined in equation (9). Second, the primary detector surface D1 is assumed to be one of the five geometries described in Table 1 (FIGS. 2A–2E). Third, the source distribution $f(\vec{x})$ has support only within a compact region. For detector geometries 1–4, the support of f is a cylindrical region of radius $R_c$ and axial length A. For spherical detector geometry (5), the support of f is a spherical region of radius $R_c$. Fourth, the parameter L in geometries 1 through 4 must satisfy the condition $L >> 4 \max(A, R_c)$. Finally, the functions g and f are related by the Compton imaging equation (11) with index $p = \pm\frac{1}{2}$ or $\frac{3}{2}$; that is $$\frac{g(\vec{z}, \vec{n}, \sigma, E)}{W(\sigma, E)} = \hat{C}_p[f] \tag{11}$$

Of course, the FBP algorithms will be different for the various indices p and detector geometries. All the FBP algorithms can be divided into four steps. The first step involves the backprojection of the data and is dependent only on the index p. The second step requires the 3D Fourier transformation of the backprojected images. The third step involves the filtering of the backprojection data and depends only on the detector geometry. The final step is a simple 3D Fourier transformation that recovers the source distribution f and is independent of either index p or detector geometry.

Figure 6:
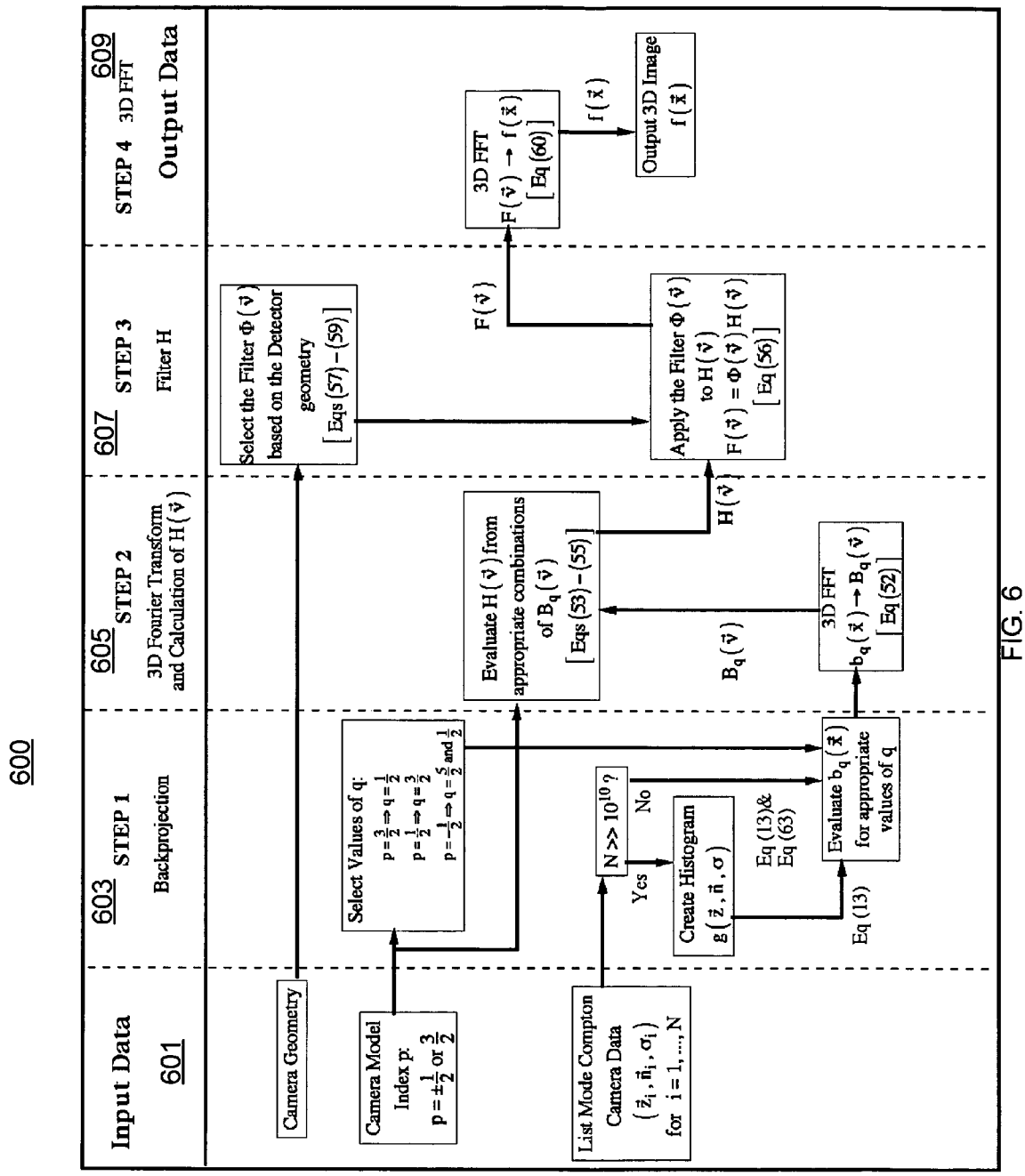
FIG. 6 shows a detailed flowchart of filtered backprojection (FBP) algorithms in accordance with an embodiment of the invention.

FIG. 6 shows a detailed flowchart of filtered backprojection (FBP) algorithms in accordance with an embodiment of the invention. FIG. 6 delineates the steps (steps 603, 605, 607, and 609) that constitute FBP algorithms in accordance with an embodiment of the invention.

Step 1 (step 603): Backprojections for Index p

In step 603, the Compton camera data $g(\vec{z}, \vec{n}, \sigma, E)$ (representing input data 601 and generated by Compton imaging equation of index p) are mapped by backprojection into various functions $b_q(\vec{x}) = \hat{B}\hat{P}_q[g/W]$ [equation (13)]. For each index p, different indices q are required for the backprojected functions $b_q(\vec{x})$. In particular, the algorithms for the three cases $p = \pm \frac{1}{2}$ and $\frac{3}{2}$ require the following backprojections:

$p = \frac{3}{2}$ requires $b_{1/2}(\vec{x}) [= h_{1/2, 3/2}(\vec{x})]$, $p = \frac{1}{2}$ requires $b_{3/2}(\vec{x}) [= h_{3/2, 1/2}(\vec{x})]$, and $p = -\frac{1}{2}$ requires both $b_{5/2}(\vec{x}) [= h_{5/2, -1/2}(\vec{x})]$ and $b_{1/2}(\vec{x}) [= h_{1/2, -1/2}(\vec{x})]$.

Step 2 (Step 605): 3D Fourier Transformation of the Backprojected Data

In step 605, the backprojected data are Fourier transformed and produce an intermediate function $H(\vec{v})$. For notational convenience, the 3D Fourier transform of the backprojected data is defined by $$B_q(\vec{v}) = \iiint d^3\vec{x}\, b_q(\vec{x}) \exp(-2\pi i \vec{v} \cdot \vec{x}) \tag{52}$$

Algorithms for the three cases $p = \pm \frac{1}{2}$ and $\frac{3}{2}$ are then given by:

$p = \frac{3}{2} H(\vec{v}) = B_{1/2}(\vec{v}) [= H_{1/2, 3/2}(\vec{v})]$, (53)

$p = \frac{1}{2} H(\vec{v}) = B_{3/2}(\vec{v}) [= H_{3/2, 1/2}(\vec{v})]$. (54)

and, $p = -\frac{1}{2}$ $$H(\vec{v}) = B_{5/2}(\vec{v}) + \frac{1}{(2\pi R_c |\vec{v}|)^2} B_{1/2}(\vec{v}) \tag{55}$$

$$\left[ = H_{5/2, -1/2}(\vec{v}) + \frac{1}{(2\pi R_c |\vec{v}|)^2} H_{1/2, -1/2}(\vec{v}) \right].$$

For each value of p, the function H corresponds to the combination of functions $H_{q,p}$ that produced $\hat{M}_k$ in equations (29), (30) and (33). The function H, therefore, satisfies the integral equation (36) as previously discussed.

Step 3 (step 607): Geometric Filtering

In step 607, the intermediate function H is converted to the Fourier transform of the source distribution, F, by the appropriate filtering (as previously discussed). The filtering is dependent on the D1 detector geometry. Thus, the function F is given by $$F(\vec{v}) = \Phi(\vec{v}) H(\vec{v}) \tag{56}$$

where the function $\Phi(\vec{v})$ is a filter function determined by the D1 geometry.

For detector geometries (i=1–3) (corresponding to FIGS. 2A, 2B, and 2C):

$[L \gg 4 \max(A, R_c)]$, the function $\Phi$ is given by $$\Phi(\vec{v}) = \frac{4\pi R_c^3}{K_i} |\vec{v}| |\vec{v} \cdot \vec{e}_z| \tag{57}$$

where $K_i$ are given by equations (41).

For detector geometry (4) (corresponding to FIG. 2D):

$[L \gg 4 \max(A, R_c)]$, the function $\Phi$ is given by $$\Phi(\vec{v}) = \frac{\pi R_c^3}{L} |\vec{v}| \sqrt{(\vec{v} \cdot \vec{e}_y)^2 + (\vec{v} \cdot \vec{e}_z)^2} \tag{58}$$

For the spherical detector geometry (5) (corresponding to FIG. 2E), the function $\Phi$ is given by $$\Phi(\vec{v}) = 2R_c^2 |\vec{v}|^2. \tag{59}$$

Step 4 (step 609): Inverse 3D Fourier Transformation

In step 609, the source distribution f is recovered from F by inverse Fourier transformation [of equation (18)]:

$$f(\vec{x}) = \iiint d^3\vec{v}\, F(\vec{v}) \exp[2\pi i (\vec{v} \cdot \vec{x})] \tag{60}$$

Steps 601–609 constitute the FBP algorithms in accordance with an embodiment of the invention. In condensed operator notation, these algorithms can be written as $$\hat{C}_{3/2}^{-1} = \mathcal{F}_3^{-1} \underbrace{[\Phi(\vec{v})]\, \mathcal{F}_3}_{\text{Filter}}\, \underbrace{\widehat{BP}_{1/2}}_{\substack{\text{Weighted}\\\text{Backprojection}}} \tag{61}$$

$$\hat{C}_{1/2}^{-1} = \mathcal{F}_3^{-1} [\Phi(\vec{v})]\, \mathcal{F}_3\, \widehat{BP}_{3/2}$$

-continued $$\hat{C}_{-1/2}^{-1} = \mathcal{F}_3^{-1}[\Phi(\vec{v})] \mathcal{F}_3 \widehat{BP}_{5/2} + \mathcal{F}_3^{-1}\left[\frac{\Phi(\vec{v})}{(2\pi R_c|\vec{v}|)^2}\right] \mathcal{F}_3 \widehat{BP}_{1/2}$$

where $\mathcal{F}_3$ denotes the 3D Fourier transformation and $\Phi(\vec{v})$ is the filter function associated with the D1 detector geometry.

Throughout the derivation of these algorithms, Compton camera data 601 are tabulated as a histogram function $g(\vec{z}, \vec{n}, \sigma, E)$. In reality, of course, the data are typically accumulated as a list of N individual (coincident) events of the form $$(\vec{z}_i, \vec{n}_i, \sigma_i, E_i) \text{ for } i=1, \ldots, N$$

Organizing these events into a histogram $g(\vec{z}, \vec{n}, \sigma, E)$ is one method of handling the data. An alternative strategy is typically more practical. If one estimates the function $g(\vec{n}, \vec{n}, \sigma, E)$ by $$g(\vec{z}, \vec{n}, \sigma, E) = \sum_{i=1}^{N} \delta(\vec{z} - \vec{z}_i) \delta(\vec{n} - \vec{n}_i) \delta(\sigma - \sigma_i) \delta(E - E_i), \quad (62)$$

the (linear) backprojection operation in Step 1 can be performed on each individual event and accumulated into the functions $b_q(\vec{x})$ as $$b_q(\vec{x}) = \sum_{i=1}^{N} \widehat{BP}_q \left[ \frac{\delta(\vec{z} - \vec{z}_i) \delta(\vec{n} - \vec{n}_i) \delta(\sigma - \sigma_i) \delta(E - E_i)}{W(\sigma_i, E_i)} \right] \quad (63)$$

Thus, one jumps directly from the list mode data to the backprojection function $b_q(\vec{x})$. The backprojection operations $\widehat{BP}_q$ require much more computation than binning the data into voxels of a histogram. Consequently, if many events fall into the same voxel of g, the accumulation of events into a histogram would reduce the computational burden. Assuming that events are limited to a narrow energy window, the domain of the function $g(\vec{z}, \vec{n}, \sigma, E_0)$ is five dimensional, whereas, the domain of $b_q(\vec{x})$ is three dimensional. This difference is important. If one samples the functions $g(\vec{z}, \vec{n}, \sigma, E_0)$ and $b^q(\vec{x})$ with 128 ($2^7$) subdivisions for each dimension, then g requires $3.4 \times 10^{10}$ ($2^{35}$) voxels, whereas, $b_q$ requires only $2.1 \times 10^6$ ($2^{21}$) voxels. For a typical acquisition with Compton camera 100, the current estimate gives the number of accumulated counts as $N \approx 10^7 - 10^9$. If $10^9$ counts are distributed among $3.4 \times 10^{10}$ voxels, it is unlikely many events will fall into the same voxel. Thus, any computational advantage of rebinning the data into a histogram g is lost. Thus, one concludes that the histogram function $g(\vec{z}, \vec{n}, \sigma, E_0)$ should not be explicitly calculated. Instead, the list mode data should be accumulated directly into the appropriate backprojection functions $b_q(\vec{x})$ as prescribed by equation (63). [For $p=\frac{1}{2}$ or $\frac{3}{2}$ only one function $b_q$ is required; whereas, for $p=-\frac{1}{2}$ two functions $b_q$ are required.] This strategy requires significantly less computer memory and should not slow the reconstruction.

A major consideration in image reconstruction is noise immunity. FBP algorithms for CT, SPECT, and PET are surprisingly immune to noisy data, but the FBP algorithms for Compton camera 100 have worrisome features that suggest noise immunity could be a problem. In the (2D) FBP algorithms for CT, SPECT, and PET, a ramp filter $|\vec{v}|$ appears in the reconstruction. This ramp filter enhances high spatial-frequencies and noise. This ramp filter is generally multiplied by a (low-pass) noise filter (e.g., a Butterworth filter) that suppresses the high-frequency noise. In general, the (3D) FBP algorithms for Compton cameras contain a quadratic filter $|\vec{v}|^2$ rather than a linear (ramp) filter and, therefore, enhance the high-frequency noise even more. One might expect, therefore, that a stronger noise filter would be required for Compton camera reconstruction. Inherently, a noise filter causes a loss of image resolution, so that one expects either noisier images or a loss of resolution in the reconstruction. Fortunately, there is an alternative method of handling the quadratic filter that apparently avoids this problem. Noting that $$\mathcal{F}_3^{-1}[-4\pi^2|\vec{v}|^2]\mathcal{F}_3 = \nabla^2, \quad (64)$$

one can write the filtered backprojection reconstruction algorithms [equation (61)] of the previous section as $$\hat{C}_{3/2}^{-1} = \mathcal{F}_3^{-1}\left[\frac{\Phi(\vec{v})}{4\pi^2|\vec{v}|^2}\right] \mathcal{F}_3 (-\nabla^2) \widehat{BP}_{1/2} \quad (65)$$

$$\hat{C}_{1/2}^{-1} = \mathcal{F}_3^{-1}\left[\frac{\Phi(\vec{v})}{4\pi^2|\vec{v}|^2}\right] \mathcal{F}_3 (-\nabla^2) \widehat{BP}_{3/2}$$

$$\hat{C}_{-1/2}^{-1} = \mathcal{F}_3^{-1}\left[\frac{\Phi(\vec{v})}{4\pi^2|\vec{v}|^2}\right] \mathcal{F}_3 \left\{(-\nabla^2) \widehat{BP}_{5/2} + \frac{1}{R_c^2} \widehat{BP}_{1/2}\right\}.$$

The filter function $\Phi(\vec{v})/|\vec{v}|^2$ is well-behaved at large spatial-frequencies and does not amplify noise. A numerical implementation of the Laplacians in equation (65) has been used successfully for data containing fewer than a million counts (so that significant statistical noise would be expected) without any noise filter.

Another concern about noise immunity arises from the weighting applied in the backprojection process. The weighted backprojection operators $\widehat{BP}_q$ add different amounts to the images depending on the distance from point of scattering in D1 detector 105. If q<2, the backprojection operator amplifies the signal near the point of detection in detector (D1) 105 and suppresses the signal far away. On the other hand, if q>2, the backprojection operator suppresses the signal near the point of detection and amplifies it far away. The latter case is bothersome because experience with attenuation correction algorithms implies that amplification of signals far from the point of detection amplifies noise. Only a small region is close to the point of scatter (in D1), whereas most of the universe is far from this point. Thus, amplification of the signal far from the point of detection implies amplification almost everywhere. The algorithm must subtly cancel such large signals in the far field for successful reconstruction. Noise disrupts this subtle cancellation and produces significant artifacts in the reconstruction. Thus, the backprojection operator $\hat{BP}_{3/2}$ that appears in the inversion for $p=-\frac{1}{2}(\hat{C}_{-1/2}{}^{-1})$ causes concern. This potential problem is best evaluated with computer studies that simulate statistical noise.

Because of these concerns, preliminary computer simulations were run to test whether the algorithms amplified noise. These initial simulations were performed for the spherical detector geometry (5) with the D1 detector radius of 6.3 cm. The reconstruction volume was (128×128×128) voxels with 1 mm on each voxel side. Inside this volume, we placed a helix source phantom 6 cm long (z axis) and having diameter 1 cm. This phantom can be visualized as a simple helical wire defined by the affine parameter t:

$$z=6t-3$$

$$x=0.5 \cos(4\pi t)$$

$$y=0.5 \sin(4\pi t) \qquad (66)$$

where 0<t<1.

The study involved the simulation of 1 million detected scatter events. Each event required the tracking of a photon emitted in a random direction from a point on the helix, then propagated to the D1 detector 105, scattered at an angle sampled from the function W, and then propagated to D2 detector 109 where the detector was assumed thick enough to assure absorption. Thus, the simulation produced data appropriate for the physical (p=0) model of the Compton camera. The scattering was assumed isotropic (W=1, rather than Klein-Nishina) and no Doppler broadening effects were included. (Later simulations using the Klein-Nishina cross-section provided virtually identical results.) The spatial and energy resolution of the detectors were assumed perfect, so that the only sources of error were the statistical noise and the index p of the reconstruction algorithm. Reconstructions were performed for the filtered backprojection algorithms described by p=½,3/2, and -½. No noise filters were used in the reconstructions. The algorithms all produced comparable results—with the conclusion that p=½ gave the marginally best results, 3/2 next best, and -½ the least successful results. The observed resolutions for all these FBP reconstructions were <1.5 mm—essentially limited by the voxel size (1 mm) of the simulation. FIGS. 7 and 8 illustrate the results of the FBP reconstruction for p=½.

Figure 7A:
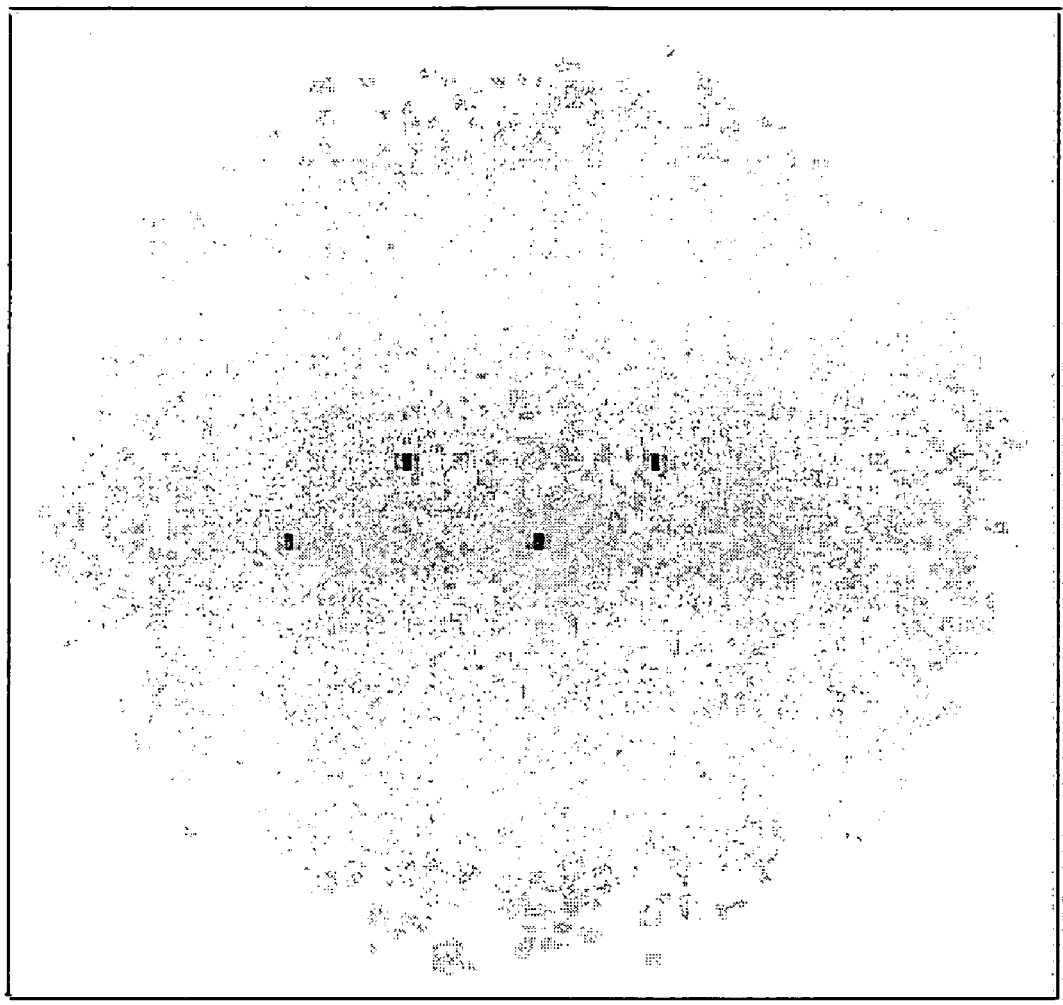
FIG. 7A illustrates an example for the reconstruction of a three-dimensional source distribution, in which the y=0 slice of the reconstructed helix (for p=½ with the appropriate filter) is shown in accordance with an embodiment of the invention.
Figure 7B:
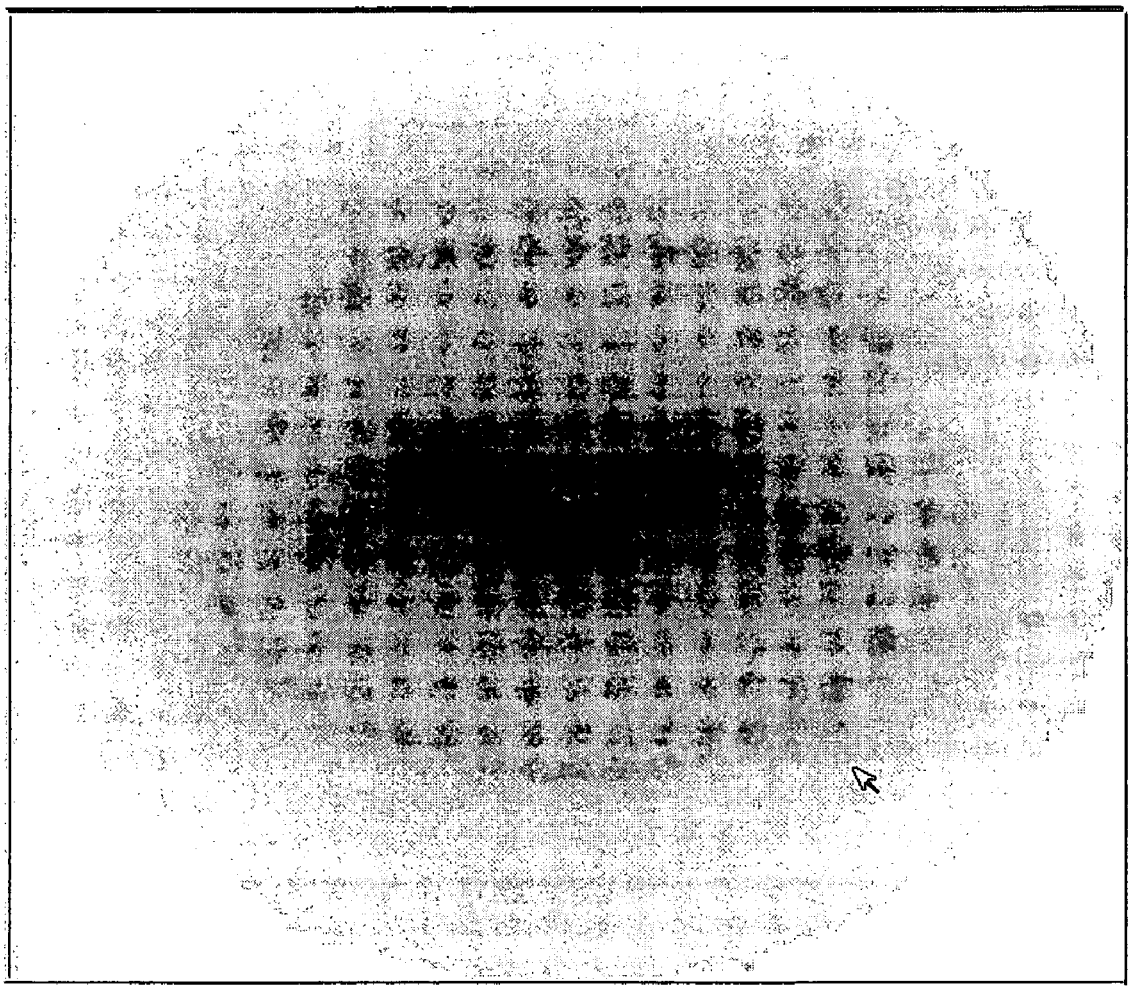
FIG. 7B illustrates an example of the reconstruction of a three-dimensional source distribution, in which the y=0 slice of the reconstructed helix (for p=½ with the no filter) is shown in accordance with an embodiment of the invention.
Figure 8:
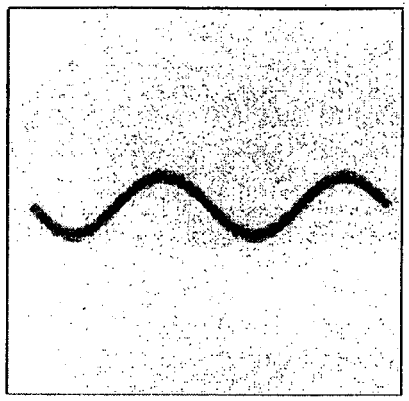
FIG. 8 illustrates projections of the reconstructed helix, as shown in FIGS. 7A and 7B, as the imaging volume is rotated by 90 degrees around the x axis in accordance with an embodiment of the invention.
Figure 8:
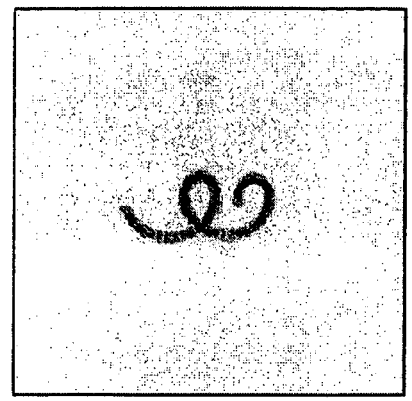
Figure 8:
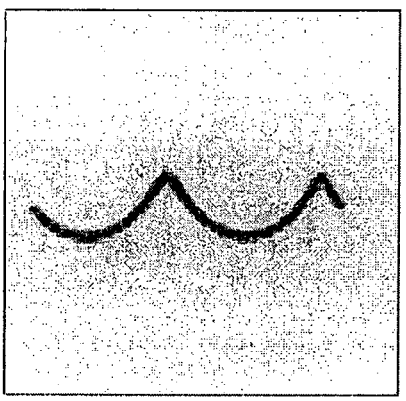
Figure 8:
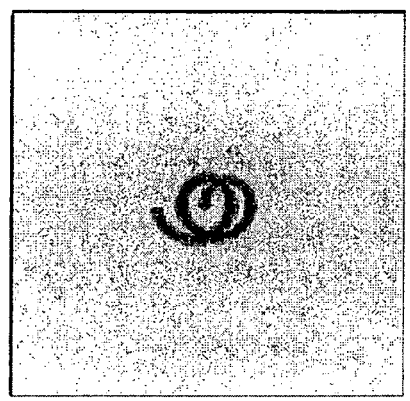
Figure 8:
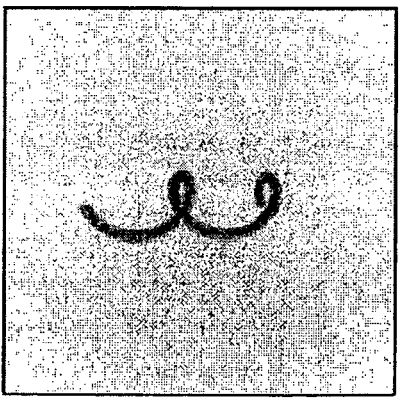
Figure 8:
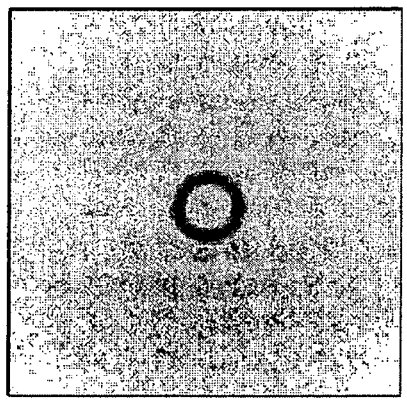

FIGS. 7A and 7B show the reconstruction results on a slice through the y=0 plane. FIG. 7A shows the results of FBP with the appropriate (Laplacian) filter; the four points where the helix intersects the y=0 plane are clearly visible. FIG. 7B shows the result of backprojection without the filter; the blurred image is comparable to the results of Rohe and Valentine. Visualization of the 3D distribution reconstructed from the helix source is difficult.

FIG. 8 shows a sequence of projections of the reconstructed distribution from various angles as the imaging volume is rotated 90 degrees around the x axis. The helix structure is clearly visible. The "bead" structure observed on the helix is a partial volume effect caused by superimposing the finite voxel size (1 mm) on the infinitely thin helical wire. These images suggest that neither the statistical noise nor the artificial index p pose significant problems for the FBP algorithms proposed in an embodiment of the invention. However, the unphysical assumptions (perfect spatial and energy resolution) leave major questions about the application of the algorithms to realistic data. More extensive simulations are required and currently underway.

In an embodiment of the invention, an integral equation (11) was introduced that describes the imaging process in Compton cameras. That integral equation was generalized with an index p that characterizes the response of the camera to sources at different distances from the primary detector. The case p=0 (corresponding to the radiation flux decreasing with distance as $r^{-2}$) is an accurate model of Compton camera performance. In an embodiment of the invention, analytic inversions were found for the cases p=±½ and 3/2 for certain detector geometries. These analytic inversions take the form of FBP algorithms. If the inverse $\hat{C}_0{}^{-1}$ were known, the analytic problem would be solved. Because $\hat{C}_0{}^{-1}$ is not known, one must hope that $\hat{C}_{1/2}{}^{-1}$, $\hat{C}_{-1/2}{}^{-1}$, or $\hat{C}_{3/2}{}^{-1}$ will serve as an acceptable approximation of $\hat{C}_0{}^{-1}$. (Attempts to find a FBP algorithm for $\hat{C}_0{}^{-1}$ are still under study. However, the most promising result yields an infinite series of different weighted backprojections and filters. Aside from serious questions of convergence, such expressions for $\hat{C}0^{-1}$ are completely unsuitable for practical applications.) If one uses $\hat{C}_p{}^{-1}$ rather than $\hat{C}_0{}^{-1}$ for image reconstruction, the resulting algorithm will produce systematic errors. These errors can be studied either analytically or experimentally with computer simulations. Analytically, one examines the difference $$\hat{E}_p = \hat{C}_p{}^{-1}\hat{C}_0 - I \qquad (67)$$

where $\hat{E}_p f$ gives the error in the reconstruction of a source distribution f. The analytic evaluation of $\hat{E}_p$ is not very difficult—the calculation is basically the same as previously discussed. The calculations of $H_{p,q}$, $M_{q,p}$ and D recur and can be evaluated in the same manner. A (chi-squared) norm of the error operator (i.e., $\|\hat{E}_p\|_2{}^2$) can be found, but such norms are notoriously bad indicators of performance in image reconstruction. Experimental computer simulations and observer performance studies are required for evaluation of these algorithms. Such studies are now underway.

In addition to the actual FBP algorithms, the mathematical analysis provides significant insights into the geometrical design of Compton cameras. Typically, the primary detectors of corresponding Compton cameras are small solid-state detectors. These small detectors may be sufficient for proving the concept because the small detector can be moved around the patient (or experimental phantom) in simulation of an extended primary (D1) detector. However, most researchers then discuss moving the camera around the patient in a circular orbit. The D1 geometry resulting from such an orbital scan is a thin ring around the patient. Unfortunately, a thin ring geometry for D1 does not produce sufficient data for the FBP algorithms in an embodiment of the invention. In an embodiment of the invention, a simple linear scan down the axis of the patient body does provide sufficient information. This counterintuitive result requires careful explanation.

The important idea of FBP algorithms is that a 3D delta function in the spatial frequency domain permits the identification of the Fourier transform of a backprojected image with the Fourier transform of the source distribution. In the preceding derivation two functions M and D were evaluated. The function M produced a 2D delta function by careful selection of the backprojection weighting; whereas, the function D produced a 1D delta function from the detector geometry. Without both delta functions, the FBP strategy generally fails (spherical geometry is an exception to this rule). For the thin ring geometry, no delta function appears in the function D (see Table 1, Geometry 3), so the FBP strategy fails. Nonetheless, one might attempt analytic inversion for the thin ring geometry. After all, the 2D delta function from the function M yields the 1D convolution integral of equation (36) that should be invertible by Fourier techniques. This approach requires two additional 3D Fourier transforms and an additional filter function. Unfortunately, the additional filter generally entails dividing by a (Bessel) function that has zeros. The divergences caused by these zeros can only be removed by orbiting the camera at two (or three) different radii and taking appropriate combinations of filters. One concludes that such a reconstruction may be possible with two or three rings and with twice the computer execution time as the FBP algorithms. In contrast, a linear scan along the z axis yields a function D with a delta function, so that a FBP algorithm follows immediately.

A Compton camera with simple linear D1 geometry provides similar data. Of course, two linear scans along the axis would be better than one, and a cylindrical detector would be better yet. However, the preceding analytic analysis demonstrates conclusively that a simple ring detector (or equivalently a small primary detector orbiting the patient) may not be a good configuration. The lesson is simple: the geometry of the primary D1 detector (or equivalently, the surface scanned by the D1 detector) is important in the reconstruction. A naive choice of this geometry can doom the best detector electronics and engineering. (On the other hand, the geometry of the secondary detector D2 is relatively unimportant. If the D2 detector samples $\vec{n}$ on a half sphere surrounding each point on D1, then sufficient information will be available for FBP.)

Figure 9:
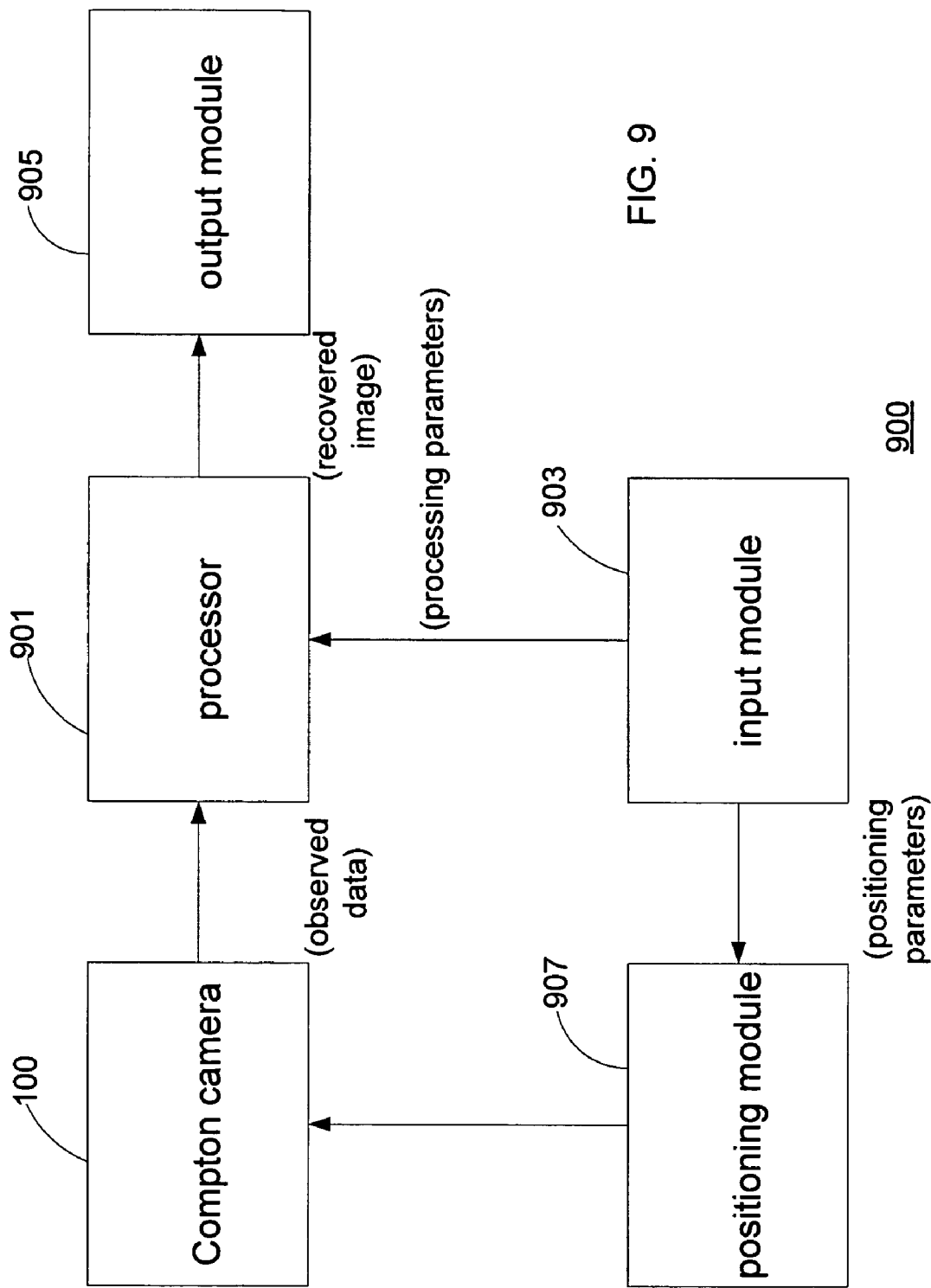
FIG. 9 shows an apparatus for reconstructing a three-dimensional image representing a source distribution in accordance with an embodiment of the invention.

FIG. 9 shows an apparatus 900 for reconstructing a three-dimensional image representing a source distribution in accordance with an embodiment of the invention. Apparatus 900 comprises Compton camera 100, processor 901, input module 903, output module 905, and positioning module 907. Compton camera 100 interfaces with processor 901 and collects observed data. Processor 901 processes the observed data to reconstruct a three-dimensional image of a radiopharmaceutical source distribution in accordance with process 600 as shown in FIG. 6.

The reconstructed image may be displayed to a clinician on output module 905. In addition, the clinician may provide processing parameters (e.g., index p) to processor 901 when reconstructing the three-dimensional image. Also, the clinician may instruct Compton camera 100 to be repositioned through positioning module 907. Alternatively, repositioning module 907 may automatically reposition Compton camera 100 such as by linearly scanning along a patient's axis in order to provide a three-dimensional image.

Appendix A: Physical Justification of the Compton Camera Equation (10)

The integral equation (10) represents a model for Compton camera imaging. In this appendix, the physical assumptions underlying that equation are elucidated. The original data from a coincident observation in the Compton camera consists of four parameters ($\vec{z}, E_1; \vec{w}, E_2$) where $\vec{z} \in D1$ and $\vec{w} \in D2$. The original data is converted into the canonical coordinates in an embodiment of the invention $$(\vec{z}, E_1; \vec{w}, E_2) \Rightarrow (\vec{z}, \vec{n}, \sigma, E) \tag{A}$$

by the algebraic relations in equation (8):

$$\vec{n} = \frac{(\vec{w} - \vec{z})}{|\vec{w} - \vec{z}|}, E = E_1 + E_2, \text{ and } \sigma = \frac{(E_2^2 + E_1 E_2 - m_e E_1)}{(E_1 + E_2) E_2}. \tag{8}$$

Equation (10) can be best understood by examination of the special case of a point source of radiation. If one assumes that $$f(\vec{x}) = \delta^3(\vec{x} - \vec{x}_0) \tag{A.1}$$

and that the original energy of emission is E, then, for p=0, equation (10) gives $$\hat{g}(\vec{z}, \vec{n}, \sigma, E) = \frac{W(\sigma, E)}{2\pi |\vec{z} - \vec{x}_0|^2} \delta\left[\frac{\vec{n} \cdot (\vec{z} - \vec{x}_0)}{|\vec{z} - \vec{x}_0|} - \sigma\right] \tag{A.2}$$

This expression for $\hat{g}$ requires physical justification. Because $\hat{g}$ describes the density of observed events in the six dimensional space ($\vec{z}, \vec{n}, \sigma, E$), one expects inverse dimensions for each of these parameters. Because the vector $\vec{z}$ is located on a 2D surface, one expects cm$^{-2}$ for that parameter. The vector $\vec{n}$ occurs on a 2-sphere and, therefore, its density is given in steradians$^{-1}$ (which is technically dimensionless). Likewise, the cosine $\sigma$ is dimensionless, whereas, the energy is assumed fixed (integrated over a narrow energy window). Thus, the function $\hat{g}$ has dimensions cm$^{-2}$ and gives the density of scatter events detected in the primary detector D1 at point $\vec{z}$ that are subsequently observed in the secondary detector with parameters $\vec{n}$, $\sigma$, and E. [In equation (A.2) the term $|\vec{z} - \vec{x}_0|^{-2}$ gives units cm$^{-2}$, W ($\sigma$, E) gives the units steradians$^{-1}$, and finally, the delta function gives the units cosine$^{-1}$.] Heuristically, one expects that $\hat{g}$ will be proportional to a product of five terms:

$$\hat{g} \propto \Phi\, P_1\, P_2\, P_3\, P_4 \tag{A.3}$$

where $$\Phi = \left\{ \begin{array}{l} \gamma\text{-ray flux at } \vec{z} \text{ in } D1 \\ \text{originating from a} \\ \text{point source at } \vec{x}_0 \end{array} \right\}, \tag{A.4}$$

$$P_1 = \left( \begin{array}{c} \text{Probability of an incident } \gamma \text{ ray} \\ \text{undergoing Compton scattering} \\ \text{in the detector } D1 \end{array} \right), \tag{A.5}$$

$$P_2 = \left( \begin{array}{c} \text{Probability of the } \gamma \text{ ray} \\ \text{being scattered in the direction } \vec{n} \end{array} \right), \tag{A.6}$$

$$P_3 = \left( \begin{array}{c} \text{Probability of the scattered } \gamma \text{ ray} \\ \text{propagating from } D1 \text{ to } D2 \end{array} \right), \tag{A.7}$$

and $$P_4 = \left( \begin{array}{c} \text{Probability of the scattered } \gamma \text{ ray} \\ \text{being detected in } D2 \end{array} \right). \tag{A.8}$$

Figure 10:
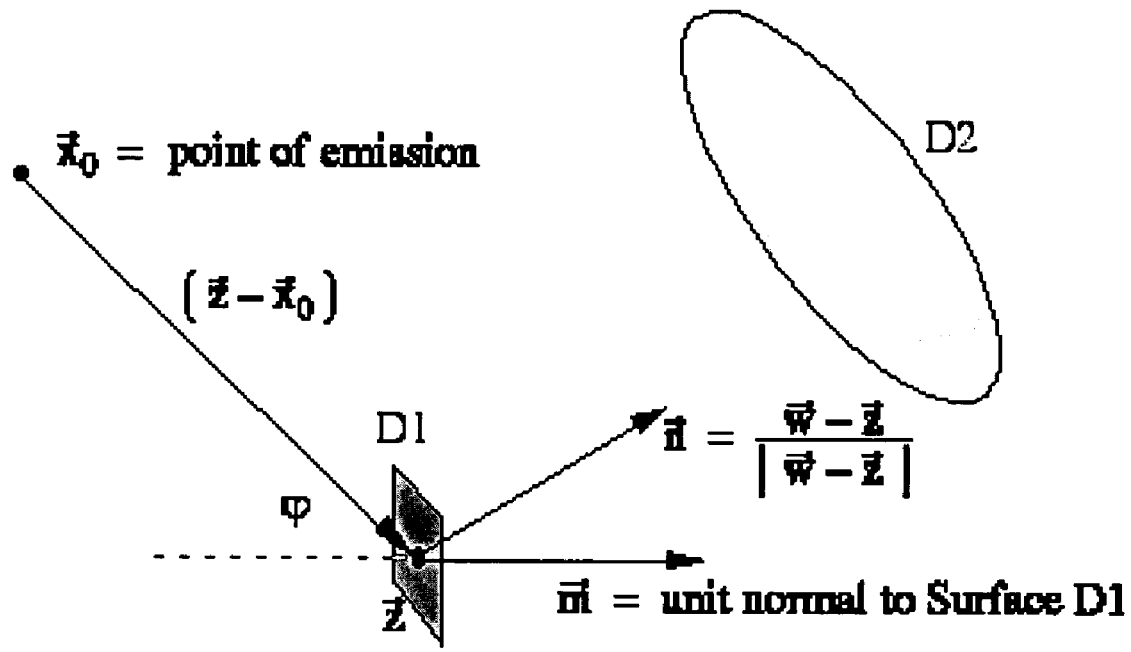
FIG. 10 shows a detector (D1) flux in accordance with an embodiment of the invention.
Figure 11:
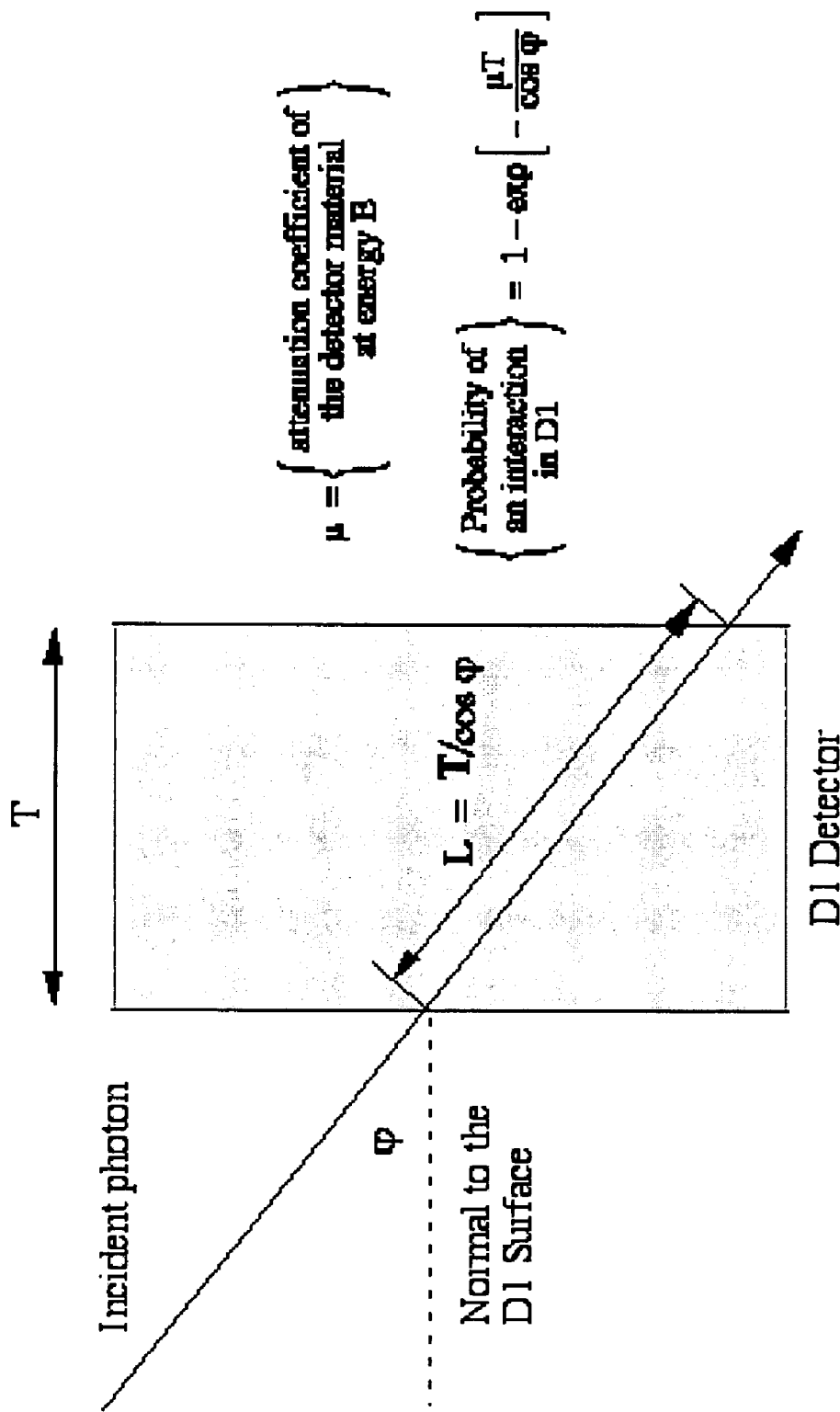
FIG. 11 shows a detector (D1) interaction probability in accordance with an embodiment of the invention.

FIG. 10 shows a detector D1 flux in accordance with an embodiment of the invention. As illustrated in FIG. 10, the flux $\Phi$ is proportional to the expression $$\Phi \propto \frac{\cos\varphi}{4\pi|\vec{z}-\vec{x}_0|^2} \tag{A.9}$$

where $\cos\varphi$ is the cosine of the angle of the incident radiation with the normal to the D1 detector surface. In particular, from FIG. 10, one finds that $$\cos\varphi = \frac{[\vec{m}\cdot(\vec{z}-\vec{x}_0)]}{|\vec{z}-\vec{x}_0|} \tag{A.10}$$

where $\vec{m}$ is a unit normal to the D1 surface. As illustrated in FIG. 11, the probability ($P_1$) of an incident gamma-ray interacting by Compton scattering in the D1 detector is given by $$P_1 = \left\{\frac{\sigma_{Compton}}{\sigma_{Total}}\right\}\left[1-\exp\left(-\frac{\mu T}{\cos\varphi}\right)\right] \tag{A.11}$$

where $\mu$ is the attenuation coefficient associated with gamma-rays of energy E in the D1 material, T is the thickness of the detector, and $\sigma_{Compton}$ and $\sigma_{Total}$ are the cross sections for Compton and all interactions, respectively. In equation (A.11), the first expression in curly brackets { } is the probability of a Compton interaction compared with all other interactions; whereas, the second expression in square brackets [ ] gives the probability of the gamma-ray interacting (by any type of interaction) within the detector. The product of these two expressions gives the probability of a Compton interaction within detector D1. The probability ($P_2$) of Compton scattering in the direction $\vec{n}$ is proportional to the differential scattering cross section [as given by W in equation (7)], $$P_2 \propto W(\sigma, E)\delta\left[\frac{\vec{n}\cdot(\vec{z}-\vec{x}_0)}{|\vec{z}-\vec{x}_0|}-\sigma\right], \tag{A.12}$$

where the delta function assures that the vector $\vec{n}$ lies on the cone with the appropriate cosine $\sigma$.

The remaining probabilities, $P_3$ and $P_4$, are both assumed constant. In reality, the probability $P_3$ of the scattered photon propagating from a point in detector D1 to a point in detector D2 is extremely complicated. Basically, the only phenomenon inhibiting the propagation of the scattered photon from detector D1 to detector D2 is a second interaction within the primary (D1) detector. Whether the scattered photon escapes detector D1 depends on the thickness of material it must transverse to escape the detector and the energy of the scattered photon. Consequently, the probability of escape depends on the depth of interaction within the detector crystal and the direction of scatter. This probability can best be studied with Monte Carlo simulations. However, for the purposes of the embodiment of the invention (namely, development of reconstruction algorithms), the probability $P_3$ will be assumed constant. On the other hand, the probability $P_4$ of detection of a scattered photon in detector D2 can be accurately estimated as $P_4 \approx 1$. The secondary detector D2 is generally designed with thick crystals so that all incident photons are absorbed. Thus, the probability of absorption $P_4$ can be assumed constant without loss of generality.

Based on the heuristic model of previous paragraphs, the function $\hat{g}$ satisfies the proportionality:

$$\hat{g} \propto \frac{P_3 P_4 \sigma_{Compton}}{2\sigma_{Total}}\cos\varphi\left[1-\exp\left(-\frac{\mu T}{\cos\varphi}\right)\right] \tag{A.13}$$

$$\left\{\frac{W(\sigma, E)}{2\pi|\vec{z}-\vec{x}_0|^2}\delta\left[\frac{\vec{n}\cdot(\vec{z}-\vec{x}_0)}{|\vec{z}-\vec{x}_0|}-\sigma\right]\right\}.$$

In equation (A.13), the expression in curly brackets { } is the desired result [equation (A.2)]. Of the remaining terms, all are constant except those containing $\cos\varphi$. Offhand, this $\cos\varphi$ dependence suggests that equation (A.2) does not accurately model the behavior of Compton cameras. However, Compton cameras are generally designed with very thin D1 detectors (so that the scattered photons are not immediately reabsorbed in D1). As a result, the expression $\mu T$ in the exponential of equation (A.13) is generally small ($\mu T \ll 1$), so that $$\left[1-\exp\left(-\frac{\mu T}{\cos\varphi}\right)\right] \approx \frac{\mu T}{\cos\varphi} - \frac{(\mu T)^2}{2\cos^2\varphi} \tag{A.14}$$

or $$\cos\varphi\left[1-\exp\left(-\frac{\mu T}{\cos\varphi}\right)\right] \approx \mu T\left[1-\frac{\mu T}{2\cos\varphi}\right] \tag{A.15}$$

If $\cos\varphi \gg \mu T$, one can approximate $$\cos\varphi\left[1-\exp\left(-\frac{\mu T}{\cos\varphi}\right)\right] \approx \mu T. \tag{A.16}$$

Thus, the $\cos\varphi$ dependence is only important for extremely obtuse angles ($\cos\varphi \approx 0$). For all other angles, one can write $$\hat{g} \propto \frac{P_3 P_4 \sigma_{Compton}\mu T}{2\sigma_{Total}}\left\{\frac{W(\sigma, E)}{2\pi|\vec{z}-\vec{x}_0|^2}\delta\left[\frac{\vec{n}\cdot(\vec{z}-\vec{x}_0)}{|\vec{z}-\vec{x}_0|}-\sigma\right]\right\}. \tag{A.17}$$

The terms containing $\cos\varphi$ in equation (A.13) are approximately constant because the decrease in flux ($\cos\varphi$) is offset by an increase in the interactions within the D1 detector $[1-\exp(-\mu T/\cos\varphi)]$ due to the increased path length (as shown in FIG. 11). If one drops the constant coefficients preceding the curly brackets { } in equation (A.17), the resulting expression is just that of equation (A.2).

If the above approximation fails, the terms containing $\cos\varphi$ will reduce the observed flux $\hat{g}$—especially for obtuse angles ($\cos\varphi \approx 0$). For a fixed source position, the angle will be smallest for the D1 pixels closest to the source, whereas, the angle will be most obtuse for pixels farthest from the source. This observation implies that, if the approximation breaks down, the reduction in flux will affect distant pixels more than near pixels. Consequently, one would expect that p<0 would provide a better approximation than p>0.

Other researchers have used alternative expressions for Compton camera response. Legitimate arguments can be made for different approximations. The relative merits of these various formulations are unclear at this time. For purposes of comparison, some of these alternative formulations will be expressed in terms of the Compton imaging operators ($\hat{C}_p$) in an embodiment of the invention. One may denote the response of the Compton camera by the function "q" (as referenced in a paper authored by R. Basko, et al., "Application of spherical harmonics to image reconstruction for the Compton camera," *Physics in Medicine and Biology*, 43, 887–894, 1998), which (using the notation of FIG. 1) can be expressed as $$q(P1, P2, \theta) \propto \int_{\substack{Cone\ of\\ Possible\\ Emission\\ Points}} dA\ f(\vec{x}) \quad (A.18)$$

$$\propto \sqrt{1-\sigma^2}\ \hat{C}_1[f].$$

One can verify the second proportionality in equation (A.18) by assuming that the function f is given by $$f(\vec{x}) = \begin{cases} f_0 & \text{if the distance between } \vec{x} \text{ and } P1 \leq R \\ 0 & \text{if the distance between } \vec{x} \text{ and } P1 > R \end{cases} \quad (A.19)$$

for arbitrary R. In that case, one finds that $$q(P1, P2, \theta) \propto \pi R^2 f_0 \sin\theta = \pi R^2 f_0 \sqrt{1-\sigma^2}, \quad (A.20)$$

whereas, $$\hat{C}_p[f] \propto \frac{f_0 R^{p+1}}{(p+1) R_c^p} \quad (A.21)$$

so that p=1 yields the appropriate weighting for the function q. One may use the same mathematical expression for the function "λ" (as referenced in a paper authored by Cree, et al., "Towards Direct Reconstruction from a Gamma Camera Based on Compton Scattering," *IEEE Transactions on Medical Imaging*, MI-13, 398–407, 1994) and, therefore, are also dealing with the p=1 problem. In both cases the sine term ($\sqrt{1-\sigma^2}$) has no significant affect on the analysis because it can be absorbed in the definition of g in the same manner as W in equation (11). Basically, this term arises because they parameterize the scatter angle in terms of $\theta$ rather than $\sigma=\cos\theta[d\sigma=-\sin\theta d\theta]$.

One may introduce an imaging kernel "k" (as referenced in a paper authored by Tomitani, et al., "Image reconstruction from limited angle Compton camera data," *Phys. Med. Biol.*, 47, 2129–2145, 2002) that can be written in the notation of this paper as $$k(\vec{x}, \vec{z}; \theta) = \frac{1}{2\pi} \delta\left[\frac{\vec{n}\cdot(\vec{z}-\vec{x})}{|\vec{z}-\vec{x}|} - \sigma\right] \quad (A.22)$$

which implies that $p = 2$.

Appendix B: Evaluation of the Function M for General Indices (q,p)

According to the notation of equation (26), the regularized form of M given in equation (25) can be written in spherical coordinates as $$M_{q,p}(\vec{v},\vec{\omega}) = \lim_{\varepsilon\to 0}\int_0^\infty dx \int_0^\infty ds\ \frac{s^q x^p}{2\pi R_c^{1+q+p}} \quad (B.1)$$

$$\exp\left[-\varepsilon\frac{(\sqrt{x}+\sqrt{s})}{\sqrt{R_c}}\right]\int\int d^2\vec{\Omega}_x$$

$$\int\int d^2\vec{\Omega}_s \frac{\exp[2\pi i\, x\, \vec{v}\cdot\vec{\Omega}_x - 2\pi i\, s\, \vec{\omega}\cdot\vec{\Omega}_s]}{|\vec{\Omega}_x - \vec{\Omega}_s|}$$

The $|\vec{\Omega}_x - \vec{\Omega}_s|$ term can found from the generating function of the Legendre polynomials [60] as $$|\vec{\Omega}_x - \vec{\Omega}_s|^{-1} = [2 - 2\vec{\Omega}_x\cdot\vec{\Omega}_s]^{-\frac{1}{2}} = \sum_{n=0}^\infty P_n(\vec{\Omega}_x\cdot\vec{\Omega}_s). \quad (B.2)$$

Furthermore, from the addition theorem of spherical harmonics, one finds that $$P_n(\vec{\Omega}_x\cdot\vec{\Omega}_s) = P_n[\cos\theta_x\cos\theta_s + \sin\theta_x\sin\theta_s\cos(\varphi_x - \varphi_s)] \quad (B.3)$$

$$= \frac{4\pi}{(2n+1)}\sum_{m=-n}^n Y_n^m(\theta_x,\varphi_x)\left[Y_n^m(\theta_s,\varphi_s)\right]^*$$

so that $$|\vec{\Omega}_x - \vec{\Omega}_s|^{-1} = \sum_{n=0}^\infty \frac{4\pi}{(2n+1)}\sum_{m=-n}^n Y_n^m(\vec{\Omega}_x)\left[Y_n^m(\vec{\Omega}_s)\right]^* \quad (B.4)$$

The oscillatory Fourier terms in equation (B.1) can be written as $$\exp(2\pi i\, x\, \vec{\Omega}_x\cdot\vec{v}) = \sum_{k=0}^\infty \frac{2\pi\, i^k}{\sqrt{|\vec{v}|x}} J_{k+1/2}(2\pi |\vec{v}|\, x) \quad (B.5)$$

$$\sum_{h=-k}^k Y_k^h(\vec{\Omega}_v)\left[Y_k^h(\vec{\Omega}_x)\right]^*$$

and $$\exp(-2\pi i\, s\, \vec{\Omega}_s\cdot\vec{\omega}) = \sum_{u=0}^\infty \frac{2\pi\, i^{-u}}{\sqrt{|\vec{\omega}|s}} J_{u+1/2}(2\pi|\vec{\omega}|s) \quad (B.6)$$

-continued $$\sum_{v=-u}^{u} Y_u^v(\vec{\Omega}_s) \left[ Y_u^v(\vec{\Omega}_\omega) \right]^*.$$

The integrals over $\vec{\Omega}_x$ and $\vec{\Omega}_s$ in equation (B.1) follow immediately from the orthogonality of the spherical harmonics $$\int\int d^2\vec{\Omega}\, Y_n^m(\theta, \varphi) \left[ Y_u^v(\theta, \varphi) \right]^* = \delta_{nu}\,\delta_{mv} \qquad (B.7)$$

so that $$\int\int d^2\vec{\Omega}_x \int\int d^2\vec{\Omega}_s \frac{\exp\left[2\pi i\, x\, \vec{v}\cdot\vec{\Omega}_x - 2\pi i\, s\, \vec{\omega}\cdot\vec{\Omega}_s\right]}{|\vec{\Omega}_x - \vec{\Omega}_s|} = \qquad (B.8)$$

$$\frac{16\pi^3}{\sqrt{xs}} \frac{1}{\sqrt{|\vec{\omega}||\vec{v}|}} \sum_{n=0}^{\infty} \frac{1}{(2n+1)} J_{n+1/2}(2\pi|\vec{\omega}|s)\, J_{n+1/2}(2\pi|\vec{v}|x)$$

$$\sum_{m=-n}^{n} Y_n^m(\vec{\Omega}_v) \left[ Y_n^m(\vec{\Omega}_\omega) \right]^*$$

By substitution of equation (B.8) into equation (B.1), one finds that $$M_{q,p}(\vec{v}, \vec{\omega}) = \frac{8\pi^2}{\sqrt{|\vec{v}||\vec{\omega}|}\, R_c^{1+q+p}} \sum_{n=0}^{\infty} \frac{1}{(2n+1)} \qquad (B.9)$$

$$\left\{ \sum_{m=-n}^{n} Y_n^m(\vec{\Omega}_v) \left[ Y_n^m(\vec{\Omega}_\omega) \right]^* \right\}$$

$$\left\{ \lim_{\varepsilon\to 0} \int_0^\infty dx\, x^{p-1/2} J_{n+1/2}(2\pi|\vec{v}|x) \exp\left[-\varepsilon \frac{\sqrt{x}}{\sqrt{R_c}}\right] \right\}$$

$$\left\{ \lim_{\varepsilon\to 0} \int_0^\infty ds\, s^{q-1/2} J_{n+1/2}(2\pi|\vec{\omega}|s) \exp\left[-\varepsilon \frac{\sqrt{s}}{\sqrt{R_c}}\right] \right\}.$$

The remaining integrals over x and S differ only in the index of the power (p or q) and, therefore, only the integral over x will be evaluated. If ($-n-1 < p < 1$), no regularization is required; one can set $\varepsilon = 0$ and find [61] that $$\int_0^\infty dx\, x^{p-1/2} J_{n+1/2}(2\pi|\vec{v}|x) = \frac{1}{2\pi^{p+1/2}|\vec{v}|^{p+1/2}} \qquad (B.10)$$

$$\frac{\Gamma\left(\frac{n}{2} + \frac{p}{2} + \frac{1}{2}\right)}{\Gamma\left(\frac{n}{2} - \frac{p}{2} + 1\right)}.$$

Because the sum in equation (B.9) requires all terms $n > 0$ one concludes that equation (B.10) is only useful for ($-1 < p < 1$). However, the subsequent analysis requires $p > 1$, hence the need for the regularization parameter. The regularization used in this analysis was chosen because the integral can be evaluated in terms of well-behaved hypergeometric functions. The expression [which is valid for $\varepsilon > 0$, $|\vec{v}| > 0$, and $-1 < p+n$] contains four terms involving successively higher powers of $\varepsilon$. Writing out only the lowest order term, one finds that $$\int_0^\infty dx\, x^{p-1/2} J_{n+1/2}(2\pi|\vec{v}|x) \exp\left[-\varepsilon \frac{\sqrt{x}}{\sqrt{R_c}}\right] = \qquad (B.11)$$

$$\frac{1}{2\pi^{p+1/2}|\vec{v}|^{p+1/2}} \frac{\Gamma\left(\frac{n}{2} + \frac{p}{2} + \frac{1}{2}\right)}{\Gamma\left(\frac{n}{2} - \frac{p}{2} + 1\right)}$$

$${}_2F_3\left(\frac{p-n}{2}, \frac{p+n+1}{2}; \frac{1}{4}, \frac{1}{2}, \frac{3}{4}; -\frac{\varepsilon^4}{(16\pi|\vec{v}|R_c)^2}\right) + o(\varepsilon).$$

Because the limit as $\varepsilon \to 0$ of the hypergeometric function is one, the limit of equation (B.11) yields $$\lim_{\varepsilon\to 0}\int_0^\infty dx\, x^{p-1/2} J_{n+1/2}(2\pi|\vec{v}|x) \exp\left[-\varepsilon \frac{\sqrt{x}}{\sqrt{R_c}}\right] = \qquad (B.12)$$

$$\frac{1}{2\pi^{p+1/2}|\vec{v}|^{p+1/2}} \frac{\Gamma\left(\frac{n}{2} + \frac{p}{2} + \frac{1}{2}\right)}{\Gamma\left(\frac{n}{2} - \frac{p}{2} + 1\right)}.$$

Thus, the regularization does not effect the preliminary results of equation (B.10); however, the range of the index p is extended to $p > -1$. The application of equation (B. 12) in equation (B.9) gives that $$M_{q,p}(\vec{v}, \vec{\omega}) = \frac{2\pi^{1-p-q}}{|\vec{v}|^{p+1}|\vec{\omega}|^{q+1} R_c^{1+q+p}} \qquad (B.13)$$

$$\sum_{n=0}^{\infty} \frac{1}{(2n+1)} \frac{\Gamma\left(\frac{n}{2} + \frac{p}{2} + \frac{1}{2}\right)}{\Gamma\left(\frac{n}{2} - \frac{p}{2} + 1\right)}$$

$$\frac{\Gamma\left(\frac{n}{2} + \frac{q}{2} + \frac{1}{2}\right)}{\Gamma\left(\frac{n}{2} - \frac{q}{2} + 1\right)} \sum_{m=-n}^{n} Y_n^m(\vec{\Omega}_v) \left[ Y_n^m(\vec{\Omega}_\omega) \right]^*$$

for all $p > -1$ and $q > -1$.

Appendix C: The Selection of Special Cases of p and q

The astute reader has probably wondered why the indices p and q were introduced and their role in the reconstruction algorithms. The technical answer is that the proper choice of p and q reduces the function $M_{q,p}$ in equation (27) to a delta function that permits easy inversion of the integral equation (24). The difficulty in equation (27) is the summation over spherical harmonics $$M_{q,p}(\vec{v}, \vec{\omega}) \propto \sum_{n=0}^{\infty} \frac{1}{(2n+1)} \frac{\Gamma\left(\frac{n}{2} + \frac{p}{2} + \frac{1}{2}\right)}{\Gamma\left(\frac{n}{2} - \frac{p}{2} + 1\right)} \qquad (C1)$$

$$\frac{\Gamma\left(\frac{n}{2} + \frac{q}{2} + \frac{1}{2}\right)}{\Gamma\left(\frac{n}{2} - \frac{q}{2} + 1\right)} \sum_{m=-n}^{n} Y_n^m(\vec{\Omega}_v) \left[ Y_n^m(\vec{\Omega}_\omega) \right]^*.$$

Virtually every paper concerning backprojection of Compton camera data [30–35] contains a similar summation. However, because other researchers chose values of p and q at the onset of their calculation, there is no way to adjust the coefficients in the summation. The ability to make such adjustments is important because the identity $$\sum_{n=0}^{\infty}\sum_{m=-n}^{n} Y_n^m(\vec{\Omega}_v)[Y_n^m(\vec{\Omega}_\omega)]^* = \delta^2(\vec{\Omega}_v - \vec{\Omega}_\omega) \quad (C2)$$

simplifies the inversion of integral equation (24). The choice of p and q is, therefore, determined by a simple condition: the coefficient $$K_{p,q}(n) = \frac{1}{(2n+1)} \frac{\Gamma\left(\frac{n}{2} + \frac{p}{2} + \frac{1}{2}\right)\Gamma\left(\frac{n}{2} + \frac{q}{2} + \frac{1}{2}\right)}{\Gamma\left(\frac{n}{2} - \frac{p}{2} + 1\right)\Gamma\left(\frac{n}{2} - \frac{q}{2} + 1\right)} = K_{q,p}(n) \quad (C3)$$

in equation (C1) must be a non-vanishing constant (that is, independent of n). The symmetry of equation (C3) permits the interchange of p and q (p↔q).

For large n, Stirling's formula for the gamma functions yields $$\lim_{n\to\infty} K_{p,q}(n) \propto n^{p+q-2}. \quad (C4)$$

From equation (C4), one concludes that p+q≦2 (C5) where the equality (p+q=2) must hold if $K_{p,q}$ is to be a non-vanishing constant.

The special case p=½, q=3/2 yields $$K_{1/2,3/2}(n) = \frac{1}{(2n+1)} \frac{\Gamma\left(\frac{n}{2} + \frac{4}{3}\right)\Gamma\left(\frac{n}{2} + \frac{5}{4}\right)}{\Gamma\left(\frac{n}{2} + \frac{3}{4}\right)\Gamma\left(\frac{n}{2} + \frac{1}{4}\right)} = \frac{1}{(2n+1)} \frac{\Gamma\left(\frac{n}{2} + \frac{5}{4}\right)}{\Gamma\left(\frac{n}{2} + \frac{1}{4}\right)} = \frac{1}{4} \quad (C6)$$

which provides the desired behavior. Because of the symmetry under exchange (p↔q), the case p=3/2, q=½ provides the same behavior. Thus, both the cases p=½, q=3/2 and p=3/2, q=½ yield the delta function of equation (C2).

APPLICABILITY OF EMBODIMENTS

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I claim:

1. A method for reconstructing image information from a Compton camera, comprising:
    (a) obtaining observed data from the Compton camera, the observed data resulting from a source distribution;
    (b) mapping the observed data by backprojection to form a backprojected function;
    (c) determining an intermediate function from the backprojected function, wherein the intermediate function is dependent on an associated transform of the backprojected function;
    (d) filtering the intermediate function to form a filtered function, wherein the filtered function corresponds to a corresponding transform of a source distribution function; and
    (e) inverse transforming the filtered function to obtain the source distribution function and to form directly a three-dimensional image representative of the source distribution.

2. The method of claim 1, wherein the source distribution function represents a distribution of a radiopharmaceutical substance within a patient's body.

3. The method of claim 1, wherein the associated transform of the backprojected function comprises an associated Fourier transform of the backprojected function and wherein the corresponding transform of the source distribution function comprises a corresponding Fourier transform of the source distribution function.

4. The method of claim 1, wherein (d) comprises:
    (i) determining a filtering function Φ from a camera geometry of the Compton camera; and
    (ii) determining the filtered function F by multiplying the intermediate function H by the filtering function Φ.

5. The method of claim 4, wherein the Compton camera comprises a primary detector and wherein (i) comprises:
    (1) determining the filtering function from a detector geometry of the primary detector.

6. The method of claim 4, wherein (i) comprises:
    (1) if a primary detector is characterized by a rectangular shape or a square prism shape or a cylindrical shape, determining the filtering function by:

$$\Phi(\vec{v}) = \frac{4\pi(R_C)^2}{K} |\vec{v}| |\vec{v} \cdot \vec{e}_Z|,$$

where $R_C$ is a corresponding parameter of the primary detector and K is a constant that is dependent on a shape of the primary detector;
    (2) if the primary detector is characterized by a circular shape, determining the filtering function by:

$$\Phi(\vec{v}) = \frac{\pi(R_C)^3}{L} |\vec{v}| \sqrt{(\vec{v} \cdot \vec{e}_Y)^2 + (\vec{v} \cdot \vec{e}_Z)^2},$$

where L corresponds to a radius of the primary detector and $R_C$ is a measure of an imaging region; and
    (3) if the primary detector is characterized by a spherical geometry, determining the filtering function by:

$\Phi(\vec{v}) = 2(R_C)^2 |\vec{v}|^2$, where $R_C$ is a radius of a corresponding sphere.

7. The method of claim 1, wherein (b) comprises:
(i) determining a first index (p), wherein the observed data is modeled in accordance with the first index and wherein the observed data is associated with a number of events;
(ii) in response to (i), selecting a second index (q);
(iii) if the number of events is greater or equal to a predetermined number, creating a histogram for the events and backprojecting the histogram in accordance with the second index; and
(iv) if the number of events is less than the predetermined number, applying a backprojection operator for each event in accordance with the second index and summing corresponding individual results.

8. The method of claim 7, wherein the first index equals a non-integer value.

9. The method of claim 8, wherein a value of the first index is selected from the group consisting $+\frac{1}{2}$, $-\frac{1}{2}$, and $+\frac{3}{2}$.

10. The method of claim 9, wherein a corresponding value of the second index equals $+\frac{3}{2}$, $+\frac{5}{2}$ and $+\frac{1}{2}$, or $+\frac{1}{2}$ if the value of the first index equals $+\frac{1}{2}$, $-\frac{1}{2}$, or $+\frac{3}{2}$, respectively.

11. The method of claim 8, wherein the first index (p) is a half-integer value.

12. The method of claim 7, wherein the predetermined value approximately equals $10^{10}$.

13. The method of claim 7, wherein (c) comprises:
(i) determining the intermediate function from a combination of Fourier transforms of the backprojected function, each associated Fourier transform corresponding to a selected second index.

14. The method of claim 13, wherein (i) comprises:
(1) if the first index equals $+\frac{3}{2}$, calculating the intermediate function by:

$H(\vec{v}) = B_q(\vec{v})$, where the second index (q) equals $+\frac{1}{2}$;

(2) if the first index equals $+\frac{1}{2}$, calculating the intermediate function by:

$H(\vec{v}) = B_q(\vec{v})$, where the second index (q) equals $+3/2$; and (3) if the first index equals $-\frac{1}{2}$, calculating the intermediate function by:

$$H(\vec{v}) = B_{q1}(\vec{v}) + \frac{1}{(2\pi R_C |\vec{v}|)^2} B_{q2}(\vec{v}),$$

where q1 is a first value of the second index and equals $+\frac{5}{2}$ and q2 is a second value of the second index and equals $+\frac{1}{2}$, and where $R_C$ corresponds to a radius of a primary detector of the Compton camera.

15. The method of claim 1, further comprising:
(f) repositioning the Compton camera; and
(g) repeating (a)–(e).

16. The method of claim 15, wherein (f) comprises:
(i) scanning the Compton camera along an axis of a patient's body.

17. A computer-readable medium having computer-executable instructions for performing the method as recited in claim 1.

18. A computer-readable medium having computer-executable instructions for performing the method as recited in claim 4.

19. A computer-readable medium having computer-executable instructions for performing the method as recited in claim 5.

20. A computer-readable medium having computer-executable instructions for performing the method as recited in claim 7.

21. An apparatus for reconstructing a reconstructed three-dimensional image of a radiopharmaceutical source distribution, comprising:
a Compton camera; and
a processor that is coupled to the Compton camera to receive camera data, the processor configured to perform:
(a) obtaining observed data from the Compton camera, the observed data resulting from a source distribution;
(b) mapping the observed data by backprojection to form a backprojected function;
(c) determining an intermediate function from the backprojected function, wherein the intermediate function is dependent on an associated transform of the backprojected function;
(d) filtering the intermediate function to form a filtered function, wherein the filtered function corresponds to a corresponding transform of a source distribution function; and
(e) inverse transforming the filtered function to obtain the source distribution function and to form directly the reconstructed three-dimensional image.

22. The apparatus of claim 21 wherein the processor, when performing (d), is configured to perform:
(i) determining a filtering function Φ from a camera geometry of the Compton camera; and
(ii) determining the filtered function F by multiplying the intermediate function H by the filtering function Φ.

23. The apparatus of claim 21 wherein the processor, when performing (b), is configured to perform:
(i) determining a first index (p), wherein the observed data is modeled in accordance with the first index and wherein the observed data is associated with a number of events;
(ii) in response to (i), selecting a second index (q);
(iii) if the number of events is greater or equal to a predetermined number, creating a histogram for the events and backprojecting the histogram in accordance with the second index; and
(iv) if the number of events is less than the predetermined number, applying a backprojection operator for each event in accordance with the second index and summing corresponding individual results.

24. The apparatus of claim 21, further comprising:
an output module that displays the reconstructed three-dimensional image of the radiopharmaceutical source distribution.

25. The apparatus of claim 21, further comprising:
a repositioning module that instructs the Compton camera to reposition along a patient's body to reconstruct a three-dimensional image of the radiopharmaceutical source distribution.

26. The apparatus of claim 21, wherein the Compton camera comprises a primary detector (D1) and a secondary detector (D2), wherein the observed data corresponds to a set of events and wherein each event ($\vec{z}$, $\vec{n}$, σ, E) is provided by the primary detector and the secondary detector, where $\vec{z}$ corresponds to a position of Compton scattering on the primary detector, $\vec{n}$ corresponds to a direction of γ-ray propagation after scattering, a corresponds to an angle of γ-ray propagation before scattering, and E corresponds to an energy of an emitted γ-ray.

27. The apparatus of claim 26, wherein a linear dimension of the primary detector is at least four times greater than a corresponding linear dimension of an object being imaged.

28. The apparatus of claim 26, wherein the processor is configured to perform:
(f) sampling the vector $\vec{n}$ on a hemisphere.

29. A method of reconstructing image information from a Compton camera, comprising:
(a) obtaining observed data from the Compton camera, the observed data resulting from a source distribution, wherein the source distribution corresponds to a radiopharmaceutical substance within a patient's body;
(b) mapping the observed data by backprojection to form a backprojected function, wherein the observed data is backprojected on a cone, and wherein (b) comprises:
  (i) determining a first index (p), wherein the observed data is modeled in accordance with the first index, wherein the observed data is associated with a number of events, and wherein a value of the first index is selected from the group consisting of +½, −½, and +³⁄₂;
  (ii) in response to (i), selecting a second index (q), wherein a corresponding value of the second index equals +³⁄₂, ⁵⁄₂ and ½, or ½ if the value of the first index equals ½, −½, or ³⁄₂, respectively;
  (iii) if the number of events is greater or equal to a predetermined number, creating a histogram for events and backprojecting the histogram in accordance with the second index; and
  (iv) if the number of events is less than the predetermined number, applying a backprojection operator for each event in accordance with the second index and summing corresponding individual results;
(c) determining an intermediate function from the backprojected function, wherein the intermediate function is dependent on an associated Fourier transform of the backprojected function;
(d) filtering the intermediate function to form a filtered function, wherein the filtered function corresponds to a corresponding Fourier transform of a source distribution function, wherein (d) comprises:
  (i) determining a filtering function Φ from a camera geometry of the Compton camera; and
  (ii) determining the filtered function F by multiplying the intermediate function H by the filtering function Φ; and
(e) inverse transforming the filtered function to obtain the source distribution function, and to obtain directly a three-dimensional image that is representative of the source distribution, wherein the source distribution function corresponds to an image of the source distribution.

* * * * *